(12) United States Patent
Bhatia et al.

(10) Patent No.: US 12,554,746 B1
(45) Date of Patent: Feb. 17, 2026

(54) CUSTOMIZED PROCESSING OF SENSOR DATA

(71) Applicant: SAP SE, Walldorf (DE)

(72) Inventors: Anubhav Bhatia, Sunnyvale, CA (US); Patrick Brose, San Francisco, CA (US); Lukas Carullo, Redwood City, CA (US); Martin Weiss, San Mateo, CA (US); Leonard Brzezinski, San Jose, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 19/287,584

(22) Filed: Jul. 31, 2025

(51) Int. Cl.
*G06F 16/28* (2019.01)
*G06F 40/169* (2020.01)
*G16Y 40/35* (2020.01)

(52) U.S. Cl.
CPC .......... *G06F 16/284* (2019.01); *G06F 40/169* (2020.01); *G16Y 40/35* (2020.01)

(58) Field of Classification Search
None
See application file for complete search history.

(56) References Cited

U.S. PATENT DOCUMENTS

| | | | |
|---|---|---|---|
| 6,308,289 B1 | 10/2001 | Ahrens et al. | |
| 8,954,226 B1 | 2/2015 | Binion | |
| 9,755,894 B2 | 9/2017 | Matthieu et al. | |
| 10,243,959 B1 | 3/2019 | Baimakhtar et al. | |
| 10,397,303 B1 | 8/2019 | Kuo et al. | |
| 10,575,250 B2 | 2/2020 | Malas et al. | |
| 10,631,029 B1 | 4/2020 | Nijim et al. | |
| 2004/0150722 A1 | 8/2004 | Hiroki | |
| 2006/0085465 A1 | 4/2006 | Nori | |
| 2007/0239681 A1 | 10/2007 | Krishnaprasad et al. | |
| 2007/0288265 A1 | 12/2007 | Quinian et al. | |
| 2008/0219658 A1 | 9/2008 | Keane et al. | |
| 2008/0288180 A1 | 11/2008 | Hayter et al. | |
| 2010/0302043 A1 | 12/2010 | Skubic | |
| 2011/0186290 A1 | 8/2011 | Roddy et al. | |
| 2011/0299455 A1 | 12/2011 | Ordentlich et al. | |
| 2012/0158821 A1 | 6/2012 | Barros | |
| 2012/0197911 A1 | 8/2012 | Banka | |

(Continued)

FOREIGN PATENT DOCUMENTS

| | | |
|---|---|---|
| CN | 105608203 | 9/2019 |
| CN | 111222568 | 6/2020 |
| WO | WO 2014/186719 | 11/2014 |

OTHER PUBLICATIONS

U.S. Appl. No. 17/000,043, filed Aug. 21, 2020, Bhatia, et al.

(Continued)

*Primary Examiner* — Eddy Cheung
(74) *Attorney, Agent, or Firm* — Klarquist Sparkman, LLP

(57) ABSTRACT

Techniques for processing sensor data are provided. Sensor data, such as individual messages or data points from devices having one or more hardware sensors, can be annotated with one or more metadata elements to facilitate sensor data processing. An annotation rule for sensor data can be determined and sensor data annotated according to the annotation rule. Sensor data can be written to a relational database table, where the table has a schema that provides columns for storing data for particular indicators of an indicator group having a plurality of indicators.

20 Claims, 19 Drawing Sheets

(56) References Cited

U.S. PATENT DOCUMENTS

| | | |
|---|---|---|
| 2013/0204849 A1 | 8/2013 | Chacko |
| 2015/0120586 A1 | 4/2015 | Schechter |
| 2015/0127284 A1 | 5/2015 | Seshan |
| 2016/0072670 A1 | 3/2016 | Matthieu et al. |
| 2016/0335865 A1 | 11/2016 | Sayavong et al. |
| 2017/0006135 A1 | 1/2017 | Siebel |
| 2017/0039227 A1 | 2/2017 | Herbst |
| 2017/0351723 A1 | 12/2017 | Vachher et al. |
| 2018/0131576 A1 | 5/2018 | Sieth |
| 2018/0248827 A1 | 8/2018 | Scharber |
| 2019/0044706 A1 | 2/2019 | Gauda |
| 2019/0095520 A1 | 3/2019 | Park et al. |
| 2019/0141006 A1 | 5/2019 | Schnitt |
| 2019/0317812 A1 | 10/2019 | Gebara |
| 2019/0317934 A1 | 10/2019 | Jentzsch et al. |
| 2020/0018618 A1 | 1/2020 | Ozog et al. |
| 2020/0219264 A1 | 7/2020 | Brunner et al. |
| 2022/0058069 A1 | 2/2022 | Bhatia et al. |
| 2022/0058166 A1 | 2/2022 | Bhatia et al. |
| 2022/0058177 A1* | 2/2022 | Bhatia ............... G06F 11/3476 |
| 2022/0308572 A1 | 9/2022 | Rao |

OTHER PUBLICATIONS

U.S. Appl. No. 17/000,057, filed Aug. 21, 2020, Bhatia, et al.
What is Apache Kafka®? https://kafka.apache.org/intro, at least as early as Aug. 21, 2020, 7 pages.
Overview of Intelligent Asset Management (IAM), https://asint.net/sap-iam-intelliegent-asset-network, at least as early as Aug. 21, 2020, 6 pages.
SAP Equipment Tables—Main List of Equipment Tables in SAP, https://sap4tech.net/sap-equipment-tables/, at least as early as Aug. 21, 2020, 16 pages.
Updating Header Information of an Item of Equipment, https://help.sap.com/viewer/76bd798328604d59bb846b97d30315e1/1911/en-US/86c6fc0872af4c27a4157eb53abbbaeb.html, at least as early as Aug. 21, 2020, 2 pages.
IoT Standards and Protocols, https://www.postscapes.com/internet-of-things-protocols/, at least as early as Aug. 21, 2020, 42 pages.
Master data and Transaction data, and Dimension and fact, https://answers.sap.com/questions/11951071/master-data-and-transaction-data-and-dimension-and.html, Sep. 11, 2015, 4 pages.
What is Master Data, ssis—What is Master Data?—Stack Overflow, at least as early as Aug. 21, 2020, 2 pages.
Non-Final Office Action received in U.S. Appl. No. 17/000,057, Nov. 15, 2021, 19 pages.
European Search Report received in European Application No. 21175395.9, Nov. 26, 2021, 24 pages.
Non-Final Office Action received in U.S. Appl. No. 17/000,043, Jan. 6, 2022, 22 pages.
European Search Report received in European Application No. 21184539.1, Mar. 10, 2022, 24 pages.
Gehrke et al., "Sensor and actuator networks—Query processing in sensor networks," IEEE Pervasive Computing, IEEE Service Center, Los Alamitos CA, US, vol. 3, No., 1, Jan. 1, 2004, pp. 46-55.
Zyrianoff et al., "Scalability of Real-Time IoT-based Applications for Smart Cities," 2018 IEEE Symposium on Computers and Communications, Jun. 25, 2018, pp. 688-693.
Cecchinel et al., "An Architecture to Support the Collection of the Big Data in the Internet of Things," 2014 IEEE World Congress on Services, Jun. 27, 2014, pp. 442-449.
Final Office Action received in U.S. Appl. No. 17/000,057, May 27, 2022, 24 pages.
Final Office Action received in U.S. Appl. No. 17/000,043, Jul. 7, 2022, 29 pages.
Hummen et al., "A Cloud design for user-controlled storage and processing of sensor data," 2012 4th International Conference on Cloud Computing Technology and Science Proceedings. pp. 232-240 (2012).
Non-Final Office Action received in U.S. Appl. No. 17/000,043, Dec. 23, 2022, 34 pages.
Notice of Allowance received in U.S. Appl. No. 17/000,057, Dec. 14, 2022, 20 pages.
Non-Final Office Action received in U.S. Appl. No. 17/000,017, Feb. 1, 2023, 28 pages.
Notice of Allowance received in U.S. Appl. No. 17/000,043, Mar. 24, 2023, 10 pages.
Final Office Action received in U.S. Appl. No. 17/000,017, Jul. 10, 2023, 25 pages.
Non-Final Office Action received in U.S. Appl. No. 17/000,017, Oct. 27, 2023, 28 pages.
Final Office Action received in U.S. Appl. No. 17/000,017, Apr. 10, 2024, 27 pages.

* cited by examiner

```
{
  "messageId": "Message_a89eae3c-1796-4812-b911-5c86bc9222a4/1eba611f-5046-4bca-a100-07cf7224ba84/1581456632000",
  "thingId": "DDC302181BE54AA7AE624C154D8BE4B2",
  "thingType": "dca.test.sap.analyticstestfnmodela:M_ANALYTICS_TEST_FN_MODEL_A",
  "namedPropertySetType": "IG_FN_Indicator_Group_10",
  "propertySetType": "dca.test.sap.analyticstestfnmodela:IG_FN_Indicator_Group_1",
  "tenant": "8a5b6545-03a6-43a4-801d-a35580da0c67",
  "measurements":
  {
    "_time": 1581456632000,
    "I_INT": 1,
    "I_DOUBLE": 1.5,
    "I_STRING": "AString",
    "I_BOOLEAN": true
  }
}
```

```
{
  "messageId": "Message_a89eae3c-1796-4812-b911-5c86bc9222a4/1eba611f-5046-4bca-a100-07cf7224ba84/1581456632000",
  "identifier": "24bc0d96e83a45fc8752acdec53813e0",
  "structureId": "MachineAlarmPST",
  "tenant": "8a5b6545-03a6-43a4-801d-a35580da0c67",
  "tags": [
    {
      "equipmentId": "F4AB2404D3AF42D69180B857B18C3FE9",
      "templateId": "DEFAULT_CAPABILITY_TEMPLATE",
      "modelId": "98B4EF52E2744EA681A6D2875FDB5055",
      "indicatorGroupId": "IG_FN_Indicator_Group_1"
    }
  ],
  "measurements": [
    {
      "_time": 1590066456508,
      "I_INT": 1,
      "I_DOUBLE": 1.5,
      "I_STRING": "AString",
      "I_BOOLEAN": true
    }
  ]
}
```

```
{
 "version": "0",
 "id": "67dca6cf-2a89-1ee0-a939-2af5a02e06b1",
 "detail-type": "AWS API Call via CloudTrail",
 "source": "aws.s3",
 "account": "123456789",
 "time": "2020-07-07T22:12:02Z",
 "region": "eu-central-1",
 "resources": [],
 "detail": {
  "eventVersion": "1.07",
  "userIdentity": {
   "type": "IAMUser",
   "principalId": "AIDAQ2HOCSVY4KKR5XEAE",
   "arn": "arn:aws:iam::123456789:user/user@email.com",
   "accountId": "123456789",
   "accessKeyId": "AABBCC12BBDDF123",
   "userName": "user@email.com",
   "sessionContext": {
    "attributes": {
     "creationDate": "2020-07-07T13:05:36Z",
     "mfaAuthenticated": "false"
    }
   }
  },
  "eventTime": "2020-07-07T22:12:02Z",
  "eventSource": "s3.amazonaws.com",
  "eventName": "PutObject",
  "awsRegion": "eu-central-1",
  "sourceIPAddress": "193.16.224.9",
  "userAgent": "[Mozilla/5.0 (Macintosh; Intel Mac OS X 10_15_5) AppleWebKit/537.36 (KHTML, like Gecko) Chrome/83.0.4103.116 Safari/537.36]",
  "requestParameters": {
   "X-Amz-Date": "20200707T221159Z",
   "bucketName": "path1-path2-numeric-aggregates",
   "X-Amz-Algorithm": "AWS4-HMAC-SHA256",
   "x-amz-acl": "private",
   "X-Amz-SignedHeaders": "content-md5;host;x-amz-acl;x-amz-storage-class",
   "Host": "dev-ax-numeric-aggregates.s3.eu-central-1.amazonaws.com",
   "X-Amz-Expires": "300",
   "key": "dca-test:da4j1k31ke19e/2020/3/10/1/path.analyticstestfnmodela:IG_FN_Indicator_Group_1/_SUCCESS",
   "x-amz-storage-class": "STANDARD"
  },
  "responseElements": null,
  "additionalEventData": {
   "SignatureVersion": "SigV4",
   "CipherSuite": "ECDHE-RSA-AES128-GCM-SHA256",
   "bytesTransferredIn": 0.0,
   "AuthenticationMethod": "QueryString",
   "x-amz-id-2": "Mbpt5IGY3cwjeV0Xhmc1IS236k3CISULjvmkZK7MDKYowcz7vN5IOK/0VcTmbDYiZcoq2GRhk=",
   "bytesTransferredOut": 0.0
  },
  "requestID": "AA0C7D619ACC6E49",
  "eventID": "7111aced-a8c1-461d-8f02-2d1e222be367",
  "readOnly": false,
  "resources": [
   {
    "type": "AWS::S3::Object",
    "ARN": "arn:aws:s3:::path1-path2-numeric-aggregates/dca-test:b7a78b42-8348-422a-8848-30e06ae61233/2020/3/10/1/path.test.sap.analyticstestfnmodela:IG_FN_Indicator_Group_1/_SUCCESS"
   },
   {
    "accountId": "123456789",
    "type": "AWS::S3::Bucket",
    "ARN": "arn:aws:s3:::dev-ax-numeric-aggregates"
   }
  ],
  "eventType": "AwsApiCall",
  "managementEvent": false,
  "recipientAccountId": "123456789",
  "eventCategory": "Data"
 }
}
```

FIG. 4

```
{
    "id": "fb2460fd-dad7-4a10-b38b-684dcd19a1d1",
    "source": "com.sap.dsc.ac.notification",
    "specversion": "1.0-rc1",
    "type": "ntf.delete",
    "datacontenttype": "application/json",
    "time": "1593665062134",
    "objectid": "CD5E1A1B86824611942802994552701A",
    "correlationid": "cd133ce2-ec49-4209-9b12-43c753d88208",
    "triggereduserid": "686F0A7F6A864795906I5E386A8B8029",
    "triggeredorgid": "4AB02F4450CE4321B3112937346944C2",
    "objectownerid": "4AB02F4450CE4321B3112937346944C2",
    "data": {
        "com.sap.dsc.ac.notification.events.EventData": {
            "old": {},
            "new": {}
        }
    }
}
```

FIG. 7A

```
"id": "fb2460fd-dad7-4a10-b38b-684dcd19a1d1",
"source": "com.sap.dsc.ac.notification",
"specversion": "1.0-rc1",
"type": "ntf.create",
"datacontenttype": "application/json",       ┌─734
"time": "1593665062134",
"objectid": "CD5E1A1B868246119428029945527O1A",    736
"correlationid": "cd133ce2-ec49-4209-9b12-43c753d88208",  ┐         730
"triggereduserid": "686F0A7F6A86479590615E386A8B8029",    ┘          │
"triggeredorgid": "4AB02F4450CE4321B3112937346944C2",     ┐          ▼
"objectownerid": "4AB02F4450CE4321B3112937346944C2",  738
"data": {                                    └─740
   "com.sap.dsc.ac.notification.events.EventData": {
      "old": {},
      "new": {
         "com.sap.dsc.ac.notification.events.NotificationKafkaObject": {      744
            "notificationGETObj": null,                                        │
            "notificationPUTObj": {                                            ▼
               "com.sap.dsc.ac.notification.events.NotificationPUT": {
                  "adminData": {
                     "com.sap.dsc.ac.notification.events.AdminData": {
                        "changedBy": {
                           "string": "A225C85404C648EF8BA4F2C5F0063293"
                        },                    └─748
                        "changedOn": {
                           "string": "2017-10-09T00:00:00.000Z"
                        },
                        "createdBy": {
                           "string": "A235C85404C648EF8BA4F2C5F0063293"
                        },
                        "createdOn": {
                           "string": "2017-10-12T00:00:00.000Z"
                        }
                                    └─748
                     }
                  },
                  "breakdown": {
                     "string": "0"
                  },
                  "causeID": {
                     "string": "1F2DCC6C88994DEAB67CD49445A688D7"
                  },
                  "confirmedFailureModelD": null,
                  "description": {
                     "com.sap.dsc.ac.notification.events.NotificationDescription": {
                        "languageIsoCode": null,
                        "longDescription": {
                           "string": "test long"
                        },
                        "shortDescription": {
                           "string": "test"
                        }         └─748
                     }
                  },
                  "descriptions": {
                     "array": [
                        {
                           "languageIsoCode": {
                              "string": "de"
                           },
```

FIG. 7B

```
    "longDescription": {
        "string": "test long de"
    },
    "shortDescription": {
        "string": "test de"
    }
},
{
    "languageIsoCode": {
        "string": "zh"
    },
    "longDescription": {
        "string": "test long zh"
    },
    "shortDescription": {
        "string": "test zh"
    }
}
]
},
"effectID": {
    "string": "63A07C8F08CA4B81B8EA12FF45E11B0F"
},
"endDate": {
    "string": "2020-04-15T00:00:00.000Z"
},
"equipmentID": {
    "string": "06001627E24A4B5882C33ADA42377473"
},
"externalID": null,
"externalSystemID": null,
"geometry": {
    "string": "Point{coordinates=LngLatAlt{longitude=31.81640625, latitude=22.737918592173564, altitude=NaN}} GeoJsonObject{}"
},
"instructionID": null,
"items": null,
"locationID": {
    "string": "E71E461967554AD19D05DD51EE43A924"
},
"maintenancePlanGroupSystemId": {
    "string": "2FC7AB39F8C347AB8D4FE7639BDFC215"
},
"maintenancePlannerGroup": {
    "string": "BANGALORE-MP"
},
"malfunctionEndDate": {
    "string": "2020-05-09T13:32:52.000Z"
},
"malfunctionStartDate": {
    "string": "2020-04-09T13:32:52.000Z"
},
"notificationID": {
    "string": "CD5E1A1B8682461194280299455 2701A"
},
"operator": {
    "string": ""
},
"priority": {
    "string": "20"
},
"proposedFailureModeID": null,
"startDate": {
    "string": "2020-04-09T00:00:00.000Z"
},
"status": {
    "array": [
        "CPT"
    ]
},
```

```
"systemProposedFailureModeID": null,
"type": {
    "string": "M2"
},                        ──748
"workCenter": {
    "string": "BANGALORE-WC"
},
"workCenterSystemId": {
    "string": "8CD1409C525A4D48B5B2A7C6E861AF89"
}
                    }
                }
            }
        }
    }
}
```

```
{
    "id": "fb2460fd-dad7-4a10-b38b-684dcd19a1d1",                    770
    "source": "com.sap.dsc.ac.notification",
    "specversion": "1.0-rc1",
    "type": "ntf.update",
    "datacontenttype": "application/json",
    "time": "1593665062134",                        774
    "objectid": "CD5E1A1B86824611942802994552701A",
    "correlationid": "cd133ce2-ec49-4209-9b12-43c753d88208",    776
    "triggereduserid": "686F0A7F6A86479590615E386A8B8029",
    "triggeredorgid": "4AB02F4450CE4321B3112937346944C2",
    "objectownerid": "4AB02F4450CE4321B3112937346944C2",     778
    "data": {                          780
        "com.sap.dsc.ac.notification.events.EventData": {
            "old": {
                "com.sap.dsc.ac.notification.events.NotificationKafkaObject": {
                    "notificationGETObj": {
                        "com.sap.dsc.ac.notification.events.NotificationGET": {      784
                            "causeDesc": null,
                            "causeDisplayID": null,
                            "causeID": {
     788                        "string": "1F2DCC6C88994DEAB67CD49445A688D7"
                            },
                            "confirmedFailureModeDesc": null,
                            "confirmedFailureModeDisplayID": null,
                            "confirmedFailureModeID": null,
                            "description": {
                                "com.sap.dsc.ac.notification.events.NotificationDescription": {
                                    "languageIsoCode": null,
                                    "longDescription": null,
                                    "shortDescription": null
                                }
                            },
                            "effectDesc": null,
                            "effectDisplayID": null,
                            "effectID": {
                                "string": "63A07C8F08CA4B81B8EA12FF45E11B0F"
                            },
                            "endDate": {
                                "string": "2020-04-15T00:00:00.000Z"
                            },
                            "equipmentID": {
                                "string": "06001627E24A4B5882C33ADA42377473"
                            },
                            "externalID": null,
                            "instructionID": null,
                            "instructionTitle": null,
                            "internalId": {
                                "string": "NO.AINMF.140"
                            },
                            "isInternal": {
                                "string": "1"
                            },
                            "malfunctionEndDate": {
                                "string": "2020-05-09 13:32:52.0"
                            },
                            "malfunctionStartDate": {
                                "string": "2020-04-09 13:32:52.0"
                            },
                            "notificationID": {
                                "string": "CD5E1A1B86824611942802994552701A"
                            },
                            "priority": {
                                "string": "20"
                            },
```

FIG. 7E

```
                    "priorityDescription": null,                              770
                    "proposedFailureModeDesc": null,
                    "proposedFailureModeDisplayID": null,
                    "proposedFailureModeID": null,
                    "startDate": {
                       "string": "2020-04-09T00:00:00.000Z"
                    },
                    "status": {
                       "array": [
                          "CPT"
                       ]
                    },
                    "statusDescription": null,
                    "systemAdministrativeData": {
                       "com.sap.dsc.ac.notification.events.SystemAdministrativeData": {
                          "systemAdministrativeDataCreatedByUserID": {
                             "string": "111F0A7F6A86479590615E386A8B8029"
                          },
  788                    "systemAdministrativeDataCreationDateTime": {
                             "string": "2020-07-02 03:15:37.151"
                          },
                          "systemAdministrativeDataLastChangeDateTime": {
                             "string": "2020-07-02 04:44:22.134"
                          },
                          "systemAdministrativeDataLastChangedByUserID": {    784
                             "string": "111F0A7F6A86479590615E386A8B8029"
                          }
                       }
                    },
                    "systemProposedFailureModeDesc": null,
                    "systemProposedFailureModeDisplayID": null,
                    "systemProposedFailureModeID": null,
                    "type": {
                       "string": "M2"
                    },
                    "typeDescription": null
                 }
              },
              "notificationPUTObj": null
           }
        },
        "new": {
           "com.sap.dsc.ac.notification.events.NotificationKafkaObject": {
              "notificationGETObj": null,
              "notificationPUTObj": {
                 "com.sap.dsc.ac.notification.events.NotificationPUT": {
                    "adminData": {
                       "com.sap.dsc.ac.notification.events.AdminData": {
                          "changedBy": {
  792                       "string": "A675C85404C648EF8BA4F2C5F0063293"
                          },
                          "changedOn": {
                             "string": "2017-10-09T00:00:00.000Z"
                          },
                          "createdBy": {
                             "string": "B1175C85404C648EF8BA4F2C5F0063293"
                          },
                          "createdOn": {
                             "string": "2017-10-12T00:00:00.000Z"
                          }
                       }
                    },
```

FIG. 7F

```
"breakdown": {
    "string": "0"                                          770
},
"causeID": {
    "string": "1F2DCC6C88994DEAB67CD49445A688D7"
},
"confirmedFailureModelID": null,
"description": {
    "com.sap.dsc.ac.notification.events.NotificationDescription": {
        "languageIsoCode": null,
        "longDescription": {
            "string": "test long"
        },
        "shortDescription": {
            "string": "test"
        }
    }
},
"descriptions": {
    "array": [
        {
            "languageIsoCode": {                           784
                "string": "de"
            },
            "longDescription": {
                "string": "test long de"
            },
            "shortDescription": {
                "string": "test de"
            }
        },
        {
            "languageIsoCode": {
                "string": "zh"
            },
            "longDescription": {                           792
                "string": "test long zh"
            },
            "shortDescription": {
                "string": "test zh"
            }
        }
    ]
},
"effectID": {
    "string": "63A07C8F08CA4B81B8EA12FF45E11B0F"
},
"endDate": {
    "string": "2020-04-15T00:00:00.000Z"
},
"equipmentID": {
    "string": "06001627E24A4B5882C33ADA42377473"
},
"externalID": null,
"externalSystemID": null,
"geometry": {
    "string": "Point{coordinates=LngLatAlt{longitude=31.81640625, latitude=22.737918592173564, altitude=NaN}} GeoJsonObject{}"
},
"instructionID": null,
"items": null,
"locationID": {
    "string": "E71E461967554AD19D05DD51EE43A924"
},
```

FIG. 7G

```
"maintenancePlanGroupSystemId": {
    "string": "2FC7AB39F8C347AB8D4FE7639BDFC215"      770
},
"maintenancePlannerGroup": {
    "string": "BANGALORE-MP"
},
"malfunctionEndDate": {
    "string": "2020-05-09T13:32:52.000Z"              784
},
"malfunctionStartDate": {
    "string": "2020-04-09T13:32:52.000Z"
},
"notificationID": {
    "string": "CD5E1A1B86824611942802994552701A"
},
"operator": {
    "string": ""
},
"priority": {
    "string": "20"
},
"proposedFailureModeID": null,
"startDate": {
    "string": "2020-04-09T00:00:00.000Z"
},
"status": {
    "array": [
        "CPT"
    ]
},                                                    792
"systemProposedFailureModeID": null,
"type": {
    "string": "M2"
},
"workCenter": {
    "string": "BANGALORE-WC"
},
"workCenterSystemId": {
    "string": "8CD1409C525A4D48B5B2A7C6E861AF89"
        }
      }
    }
   }
  }
 }
}
```

```
sap.ain.metaData::Equipment.Category    808
Client
EquipmenttD
CategoryID
EquipmentVersion
BaselineID
SystemAdministrativeData.CreatedByUser.1O
SystemAdminis1rativeData.Creat1onDateTime
SystemAdministrativeData.LastChangedByUser.ID
SystemAdministrativeData.LastChangeDateTime
```

```
sap.ain.metaData::Equipment.Description    808
Client
ID
LanguageISOCode
EquipmentVersion
BaselineID
Short
Long
```

```
sap.ain.metaData::Equipment.Header    808
Client
ID
EquipmentVersion
BaseLineID
ModelID
Name
Location
Criticality
EquipmentStatus
Status
IsActive
InstallationDate
BuildDate
SafetyRisk
SerialNumber
BatchNumber
TIN
TagNumber
Coordinates
Keywords
Completeness
isMarkedForDeletion
ImageURL
Operator
Lifecycle
Ii UfeCycleDate
SouceBPRole
SystemAdminisb ativeData.CreatedByUser.ID
SystemAdministrativeData.CreationDateTime
SystemAdministrativeData.LastChangedByUser.ID
SystemAdministrativeData.LastChaAgeDateTime
HeaderPercentage
ValuePercentage
AttachmentPercentage
InstructionPercentage
EquModelName
133 EquManufacturerName
ObjectType
FirmwareVersion
ProcurementNumber
ManufacturerPartNumber
SecondaryKey
EquSubclass
ClassName
SubclassName
RootEquipment
PlanningPlant
PlamerGraup
SalesOrganization
DistributionChannel
Division
SalesOffice
SalesGroup
UID
```

```
sap.ain.metaData::Equipment.MaterializedHeader
Client
ID                                       808
Status
ModelID
ModelName
IntenaIId
SerialNumber
BatchNumber
TIN
TagNumber
Coordinates
Completeness
ImageURL
LifeCycle
OperatorId
OperatorName
SystemAdministrativeData.CreatedByUser.ID
SystemAdministrativeData.CreationDateTime
SystemAdministrativeData.LastChangedByUser.ID
SystemAdministrativeData.LastChangeDateTime
EquManufacturerId
EquManufacturerName
ProcurementNumber
ManfacturerPartNumber
SecondaryKey
PublishedOn
SourceId
SourceName
LocationId
LocationName
CriticalityCode
ModelTemplateId
ModelTemplateName
SubclassId
SubclassName
ClassId
ClassName
IsOperatorYalid
IsManufacturerValid
IsClientValid
SoldTo
ParentId
ParentName
HasInRevision
Read
Write
EquipmentVersion
```

```
                                    816
Com.sap.iam.analytics::EQUIPMENT
EQUIPMENT_ID
LAST_SYNCED_AT
TENANT_ID
BATCH_NUMBER
BUILD_DATE
SHORT_DESCRIPTION
LONG_DESCRIPTION
DISTRIBUTION_CHANNEL
DIVISION
EQUIPMENT_VERSION
FIRMWARE.VERSION
EQUIPMENT_IN_REVISION
IMAGE_URL
INTERNAL_ID
OPERATOR_IS_VALID
IS_ROOT
KEYWORDS
LIFECYCLE_CODE
MANUFACTURER_ID
MANUFACTURER_NAME
MANUFACTURER_PART_NUMBER
MODEL_ID
MODEL_KNOWN
MODEL_INTERNAL_ID
EQUIPMENT_NAME
OPERATOR_ID
OPERATOR_NAME
PLANNER_GROUP
PLANNING_PLANT
PROCUREMENT_NUMBER
PUBLISHED_DATE
SALES_GROUP
SALES_OFFICE
SALES_ORGANIZATION
OPERATOR_EQUIPMENT_ID
SERIAL.NUMBER
SOLD_TO
SOURCEID
SOURCE_BUSINESS_PARTNER_ROLE
EQUIPMENT_STATUS_CODE
EQUIPMENT_SUBCLASS_ID
TAG_NUMBER
TECHNICAL_IDENTIFICATION_NUM8ER
```

FIG. 8B

CUSTOMIZED PROCESSING OF SENSOR DATA

FIELD

The present disclosure generally relates to techniques for processing data from devices having one or more hardware sensors. In a particular example, data from such devices is annotated with one or more metadata elements to facilitate data processing. In another example, techniques for writing and storing sensor data are provided.

BACKGROUND

As computing devices become smaller and more powerful, increasing amounts of data can be become available for analysis. For example, sensors (which can be incorporated into smaller devices that are in turn paired with larger devices) that are connected to a network, either wirelessly or via a wired connection, are increasingly being incorporated into devices or environments. These interconnected devices can be referred to as the Internet of Things (IOT). The amount of data produced by IOT devices can be massive. Accordingly, room for improvement exists in dealing with IOT data, including ingesting and processing IOT data such that is available for use by applications.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques for processing sensor data are provided. Sensor data, such as individual messages or data points from devices having one or more hardware sensors, can be annotated with one or more metadata elements to facilitate sensor data processing. An annotation rule for sensor data can be determined and sensor data annotated according to the annotation rule. Sensor data can be written to a relational database table, where the table has a schema that provides columns for storing data for particular indicators of an indicator group having a plurality of indicators.

In one aspect, the present disclosure provides a method for annotating sensor data. Sensor data is obtained from a plurality of devices, each device having one or more hardware sensors. An annotation rule is determined for the sensor data. The sensor data is annotated according to the annotation rule.

In another aspect, the present disclosure provides a method for writing sensor data to a relational database table. A request is received to write data for an indicator group having a plurality of indicators, where an indicator can be a hardware sensor of a device. A relational database table for the indicator group is instantiated. The table includes, for each indicator in the indicator group, a column to store sensor data for that indicator. Sensor data for the indicator group is received. The sensor data is written to the relational database table.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIG. 2A is JSON listing of an example message from an IOT device.

FIG. 2B is a JSON of an example message from an IOT device, annotated with additional metadata elements.

FIG. 4 is a JSON listing of an example message indicating that a new aggregate is available for processing for storage in an analytics platform.

FIG. 7A is an example JSON listing of a message to delete master data.

FIGS. 7B-7D provide an example JSON listing of a message to add master data.

FIGS. 7E-7H provide an example JSON listing of a message to modify master data.

FIG. 8A illustrates a portion of a source master data schema.

FIG. 8B illustrates a master data schema that can be used for data analytics and can mapped to from the source master data schema of FIG. 8A.

DETAILED DESCRIPTION

Example 2)—Overview

Figure 1:
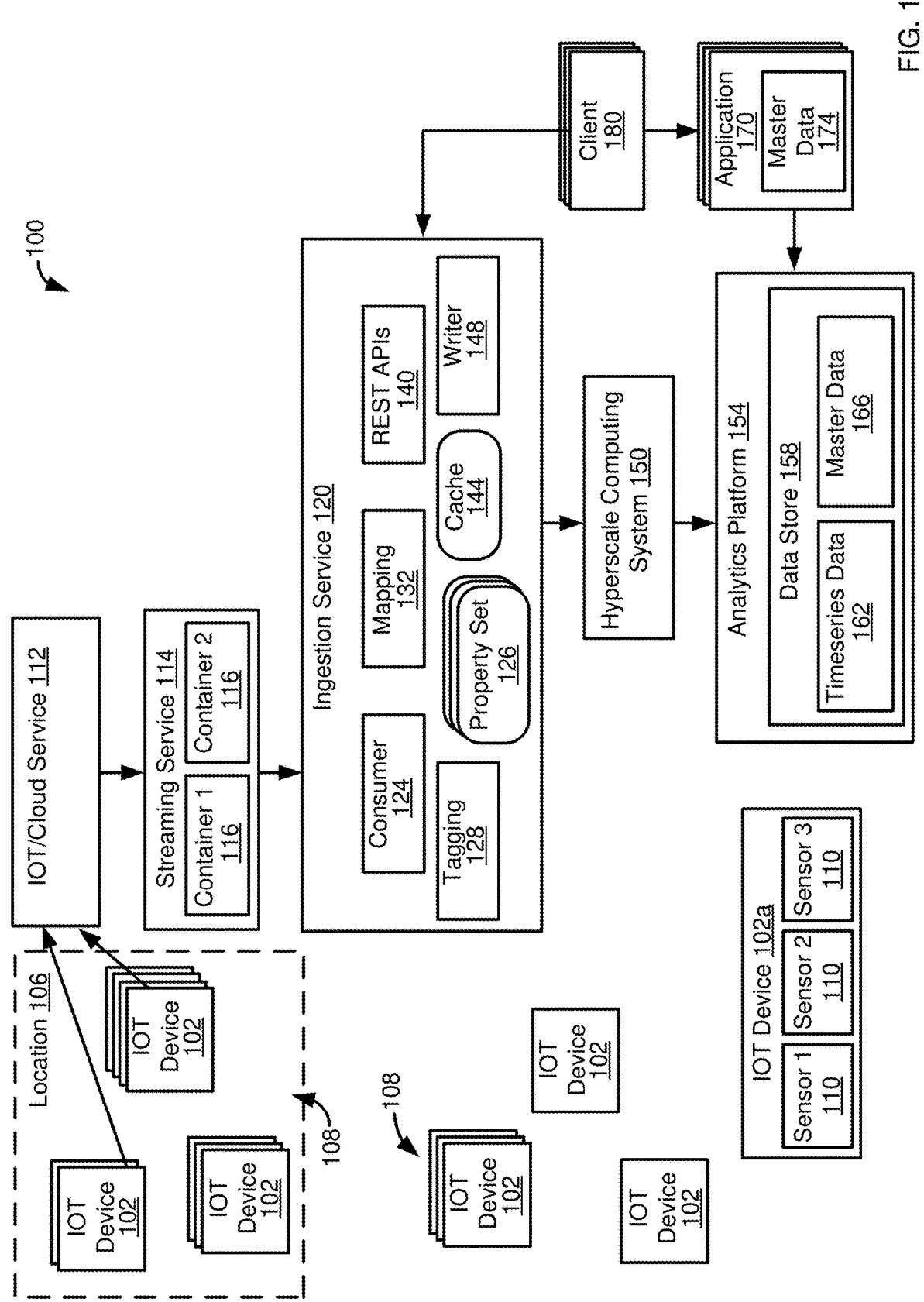
FIG. 1) is a diagram of a computing environment in which disclosed technologies can be implemented, where the computing environment facilitates writing of data from IOT devices, or produced therefrom, to an analytics platform.

As computing devices become smaller and more powerful, increasing amounts of data can be become available for analysis. For example, sensors (which can be incorporated into smaller devices that are in turn paired with larger devices) that are connected to a network, either wirelessly or via a wired connection, are increasingly being incorporated into devices or environments. These interconnected devices can be referred to as the Internet of Things (IOT). The amount of data produced by IOT devices can be massive. Accordingly, room for improvement exists in dealing with IOT data, including ingesting and processing IOT data such that is available for use by applications.

In many applications, to make IOT data useful, the IOT data from IOT devices (sometimes referred to as edge devices) is combined with other data that provides context for, or otherwise enriches, the IOT data. IOT data may have relatively little descriptive information, which can be useful for a number of reasons. Transmitting reduced amounts of information can conserve network and processing resources of an IOT device, as well as reducing power usage. In addition, having limited descriptive information in IOT data can be useful in allowing end uses of the IOT data to change without requiring changes to the IOT device/a format in which IOT data is sent.

Typically, IOT data is not in a format in which the data will be eventually processed. That is, along with missing descriptive information, IOT data is often in a semi-structured format that may not lend itself as well to analysis and presentation. For example, many applications that query and process data (including various analytics applications) may be configured to use structured data, such as data maintained in a relational database system. In order to provide context to IOT data and to facilitate processing and analysis, it may be useful to combine the IOT data with information maintained in a structured format, such as master data or other attributes related to the IOT data/devices that may be stored in relational database format. Maintaining the IOT data and master data (or other descriptive data) in a common format, such as a relational database system, can help in combining or otherwise processing data from these different sources, such as by performing JOIN operations (e.g., in SQL or another query language).

For many applications then, two processes are needed to enable analytical queries or other data processing. First, IOT data from IOT devices needs to be ingested and converted to a format where it can be combined with master data or other structured data. Second, such master data or other structured data needs to be obtained. These processes can be complicated for a number of reasons, including when a system that enables analytical applications for IOT data is useable with a variety of IOT devices/IOT platforms, may be used by a number of different entities (e.g., tenants in a multitenant database or other multitenant application architecture), and may be associated with master data or other descriptive data that may come from a number of different data sources, which may have different data models or schemas, and where the original data models or schemas are not optimized for analytical applications.

The present disclosure provides technologies that can be used to address one or more of the issues noted above. Much of the following disclosure refers to "cloud-based systems" for sake of convenient presentation. Cloud-based system can also be referred to as hyperscale computing systems, and those terms are used interchangeably in the present disclosure. IOT data may originally be collected by a cloud-based system, processed IOT data may be stored in a cloud-based system, master data can come from applications that are cloud-based and may be stored on the cloud-based system with the IOT data. The cloud-based systems may be the same or different depending on implementation.

However, it should be appreciated that the disclosed technologies are not limited to cloud-based systems, unless the context of the discussion clearly requires it. For example, disclosed technologies can be used with remote computing systems that might not be typically considered to be "cloud-based." In addition, one or more systems may be non-cloud based/non-remote systems, such as being maintained on a computing system or computing device maintained by an entity.

Cloud-based systems are often provided by an enterprise that is different than an enterprise whose users access the cloud-based system. However, disclosed technologies can be applied to computing systems associated with the same enterprise. Similarly, cloud-based resources may be more physically remote than in other types of networked environments. That is, in a networked environment, a computing device might be considered "remote" from another computing device if they are on separate machines or if they do not share certain computing resources (e.g., a file system, name space, memory space). On the other hand, cloud-based systems may have machines that are separated by many miles from the devices which access the resources of the cloud-based system. So, a remote computing device, or system, as used herein refers to physically separate computing devices that typically communicate over a network, but no particular degree of "remoteness" is required.

Accessing remote resources can also be desirable because it can be more cost effective than maintaining a local system. For example, having a cloud provider handle infrastructure issues, such as making sure suitable hardware is available, can allow users greater flexibility, as they can scale up and scale down their use of cloud services as needed. Having a provider maintain and configure software can reduce costs for entities, since they can maintain a smaller number of qualified personnel, and obtaining software as a service from a vendor can improve performance and availability, as the vendor may be better able to update and configure the software.

As mentioned, IOT data as received from an IOT device typically has relatively limited identifying information or metadata, primarily consisting of measurements or similar information recorded by sensors associated with the IOT device. In one aspect, the present disclosure provides an ingestion process where each measurement from an IOT device is annotated (or tagged) with a selected set of attributes (e.g., a type of metadata, which can also be referred to as a metadata element or a property), which can be, or can include, attributes selected from a set of master data. Annotating attributes can facilitate storage and processing of the IOT data, such as by indicating to an aggregation component how aggregations (where an aggregate can also be referred to as a composite or a composite value) should be calculated (e.g., a frequency of aggregation, a granularity of aggregation, values calculated during aggregation) or to a storage component to indicate where/how individual IOT data messages or aggregates should be stored. Such annotations can be particularly useful when a system processes IOT data from multiple clients (e.g., tenants), to ensure that IOT data for one tenant is stored for that tenant in a manner that keeps it at least logically separated from data for other tenants.

Annotations can be specified for particular types or sets of IOT devices, particular tenants, etc. In at least some cases, attributes used for annotations or values for these annotations can be dynamically retrieved. If an IOT message is received, APIs can be used to obtain information indicating what attributes should be used to annotate particular messages. Or, the APIs can be used to determine particular values for particular attributes that should be used to annotate a given IOT data message received (directly or indirectly) from an IOT device. As retrieving the attributes/values can be time/resource intensive, an annotation cache can be maintained. In some cases, annotation information can be dynamic/configurable. If a configuration changes, a notification can be sent to an annotation component, which optionally can invalidate cached attributes or attribute values.

As discussed above, in at least some implementations master data or other attributes that might be used with IOT data can be received from other applications or data sources. The present disclosure provides a master data ingestion component/pipeline that can receive messages from applications, where the messages contain at least some master data/attributes or provide information that can be used to obtain master data/attributes or other information that can be used in conjunction with data analytics applications. In specific cases, a notification is analyzed to determine information needed to process a request relating to master/data attributes, including obtaining master data/attributes from particular applications or data sources (which can include an application that generated the message).

In some cases, master data/attributes can come from multiple sources, where the master data may be maintained in different schemas (e.g., tables may contain different attributes, attributes may have different names or data types), or a source schema is not optimized for analytics applications, particularly applications that involve IOT data. Disclosed technologies provide an analytics data schema that can be used as a common schema for master data/attributes from source schemas of multiple sources, and which can be more optimized for analytics. In at least some cases, data in the analytics/common schema is denormalized with respect to at least some of the corresponding tables (or other sources) in the original data model. This denormalization/consolidation can result in better performance, such as by reducing query processing time and resource use by reducing table JOIN operations.

Different IOT data sources, such as cloud storage/hyperscale computing systems, can be associated with different protocols, methods of operation, interfaces, etc. In one aspect, the present disclosure provides an interface that can be called by components associated with obtaining and processing IOT data. In this way, the underlying details of the operation of a cloud provider or other IOT data service can be abstracted from the application. One benefit of this technique is that the same pipeline can be used with a variety of cloud providers/IOT data sources, which can allow the pipeline to be used, for example, by different clients who may use different platforms, or more easily allow a client to transition between different platforms. The interface can include methods to write data, such as data tagged or annotated as described above, to the IOT data service/platform or to read data from the service/platform, such as writing aggregates generated by the service/platform to a relational database, or other structured data storage/retrieval system. An interface method can allow users to configure other aspects of the service/platform, such as how data is stored, or how aggregates are calculated.

Particularly given that IOT data can be very voluminous, it can be important to design systems that efficiently process the IOT into a format that can be more easily consumed by applications used by end users (e.g., for IOT data analytics). Storing such IOT data efficiently can also be important. In one aspect, tables are defined for specific groups of attributes, which can be attributes related to IOT data or attributes related to master data/semantic attributes used to provide context for IOT data. In one example, sensors, or indicators, from IOT devices are grouped into indicator groups. A table can be defined for each indicator group.

Particularly when aggregates produced from IOT data are calculated, and optionally stored, based on indicator groups, storing data based on indicator group can allow for efficient data processing. For example, a thread that carries out operations for a database writer can execute read and write operations for aggregates for an indicator group to a table for that indicator group without interfering with other threads that may be performing operations for other indicator groups. Thus, issues such as lock conflicts and delays can be reduced, and parallelism increased.

In addition to storing IOT data aggregates in tables by indicator groups, it can be useful to structure a table such that a table for an indicator group includes columns for each indicator (sensor, source of IOT data). Formatting a table in this way can allow data types for each indicator to be preserved, as compared with a table schema that includes a column for an indicator identifier and a column for a value for that indicator. In such a schema, the "value" column would typically reduce all data types (e.g., integers, floats, dates, Boolean values) to a common data type (such as a string), which can be determinantal to downstream data processing applications. In addition, particularly when the tables are maintained in a column format (i.e., in a column store as opposed to a row store), providing columns for each indicator can allow for data compression, and for facilitating the alteration of indicator groups.

Another benefit of the above-described table schema is that it can easily handle the creation of new indicator groups or the modification of existing indicator groups. In the case of a new indicator group, a table can easily be created using rules that define columns for particular attributes of the IOT data as well as columns representing aggregated values for each indicator. If an indicator is added to an indicator group, the table can be altered to include a column for the indicator. Optionally, aggregates values for existing rows can be calculated for the added indicator/column. If an indicator is removed from an indicator group, the corresponding column can be removed from the table. In at least some cases, the column is not deleted, or is not immediately deleted, but the column is excluded from results for the indicator group (e.g., based on a definition of the indicator group that is joined with the table, or otherwise used to define data to be retrieved from the table). Moving an indicator between indicator groups can be accomplished by a combination of add/remove indicator operations as described above.

Particularly in view of some of the operating environments of IOT devices, it is possible that some indicators may not send their data in real time or in a time period in which such data might normally be expected to be received. Typical IOT data pipelines are not able to retroactively process late IOT data, or at least IOT data that is received after a certain time period. Disclosed technologies allow for late-arriving data to be processed. An aggregation process can detect when new IOT is available and generate a new or updated aggregate, which then can be made available for further processing.

A process that writes data to a database table can determine whether the data to be written corresponds to new data or updated data, and can add rows or update rows for the table correspondingly. In some cases, unaggregated data may be discarded from storage (e.g., cloud storage) before aggregated data is discarded. Particular technologies maintain information along with aggregated values (e.g., data point counts) that allow updated aggregated values to be calculated (e.g., using a weighting based on an updated count) even when data for the individual data points is no longer available.

Example 3)—Example Annotation of IOT Device Messages

FIG. 1 illustrates an example computing environment 100 that can be used to obtain and process IOT data from one or more IOT devices 102. The IOT devices 102 can be associated with a particular environment, such as a particular machine or a particular physical location 106. IOT devices 102 can be grouped into one or more groups 108. Groups of IOT devices 102, of particular sensors of IOT devices, or combinations thereof, can be referred to as indicator groups.

IOT devices 102 can be grouped based on one or more criteria. For example, all IOT devices 102 in a particular location 106 (e.g., a production line) or that serve a particular purpose can be grouped. Groupings can also be made based on one or more types of readings provided by an IOT device 102, or a particular element (e.g., sensor) thereof. For instance, all or a portion of IOT devices 102 that include temperature sensors can be included in one group, while pressure sensors can be collected in another group.

The IOT devices 102 are typically network-enabled devices. Although "internet of things" devices can refer to devices having a variety of characteristics, in at least some cases, internet of things devices can refer to devices having embedded computing systems, having special-purpose hardware or software (e.g., as opposed to being a general-purpose computing device), or a device not traditionally associated with computing or network connectivity.

As an example, refrigerators have existed for quite some time, and generally had no, or very limited computing capabilities (e.g., controlling lights and cooling components, providing a display, receiving user input), which capabilities would typically not be understood to include network connectivity. However, refrigerators are now being produced with embedded computing devices that include network connectivity, such as using Wi-Fi, Bluetooth, ZigBee, Z-Wave, cellular networks, near field communication, Sigfox, Neul, or LoRaWAN. Adding network connectivity, and potentially additional computing power or functionality (albeit still typically limited compared with more general purposing computing devices such as personal computers, tablets, and smartphones), can transform the refrigerator into an IOT device.

Internet of things devices, or devices 102 otherwise useful in aspects of the present disclosure, typically include one or more hardware sensors. That is, internet of things devices can detect information regarding their surroundings or use and communicate that information over a network. In some cases, a given IOT device 102 (device 102a, as shown) can have multiple sensors 110, including sensors that may be of different types. In such cases, groupings (e.g., indicator groups) can be made at the granularity of individual sensors 110 of IOT devices 102.

Sensors used by the devices 102 can include positional sensors, which can be used to determine the relative or absolute position of an object. Positional sensors can include those typically included in an inertial measurement unit (IMU), including accelerometers, gyroscopes, magnetometers, and combinations thereof. For instance, a gate, door, or turnstile, can be equipped with one or more accelerometers, where a set degree or range of motion indicates that the admission control device has been activated and an admission event has occurred. Positional sensors can also include sensors that determine a geospatial location of an object, such as using a global navigation satellite system (GNSS, e.g., the Global Positioning System, or GPS). Geospatial position can be determined by other types of positional sensors, such as wireless transceivers. That is, a receiver component can use techniques such as triangulation, and measurements of signal strength, in order to determine a position.

Sensors used by devices 102 can also include radiation sensors, such as to sense when an individual or item has passed proximate the sensor, such as into an area that is controlled or monitored by the admission control devices. Suitable radiation sensors include infrared and visible light sensors, as well as ultrasonic sensors. Radiation sensors can include cameras, such as a still camera or a video camera.

Devices 102 can be used for equipment monitoring. When used for equipment monitoring, devices 102 can monitor the status of a device or system (the equipment) on which the device is installed. Equipment monitoring can be used to determine, for example, how many times the device, or a component thereof, has been activated. This information can be used to determine an operational or maintenance condition of the device, such as if the device is due for scheduled or preventative maintenance.

Parameters such as operating temperatures and pressures can be monitored, which can be used to determine if the device is operating within normal parameters, may be in need of repair, whether operating conditions need to be adjusted, or whether preventative or scheduled maintenance should be performed. An abnormally high temperature associated with the device may indicate that a particular component, or the device itself, is ready to fail and should be replaced. In addition to potentially reducing repair or replacement costs (e.g., because a device may be easier to maintain prior to failure), equipment monitoring using devices 102 can reduce equipment downtime and can reduce health and safety concerns.

In at least some implementations, data from the IOT devices 102 is sent to an IOT or cloud service 112. The IOT or cloud service 112 is typically configured to receive and store data from IOT devices. The IOT or cloud service 112 can send IOT data to a streaming service 114. The streaming service 114 can be in a published-subscriber relationship with the IOT or cloud service 112. The streaming service 114 can include software such as KAFKA, available from the Apache Software Foundation (Forest Hill, MD). Data can be stored in the streaming service 114 in one or more containers 116 (which can be containers configured to store timeseries data). Typically, the containers 116 are associated with a particular topic, and data from particular IOT devices 102 (or sensors thereof) is routed to the appropriate container.

Data in the streaming service 114 can be periodically read by an ingestion service 120, such as by a consumer component 124 of the ingestion service. IOT data received by the consumer component 124 can be annotated by a tagging component 128. The tagging component 128 can add or edit data, such as metadata, for each element (e.g., a message or other discrete reading or measurement provided by an IOT device 102) of data sent from an IOT device. Annotations applied by the tagging component 128 can correspond to attributes, such as attributes from a master data schema of a relational database system. The tags can be used in further processing of the IOT data, such as determining where/how data is stored, how long data is maintained, how data is aggregated, where aggregated data is maintained, how long aggregates are maintained, a table to which data elements from the IOT data will be written, and can supply values that are included in a table (or other structured data format) to which data elements of the IOT data will be written.

As an example, various annotations can be applied to IOT data to indicate how an IOT device 102 relates to another device, such as a device into which the IOT device is incorporated or with which it is otherwise associated, or indicating how multiple IOT devices relate to one another. As has been described, individual IOT devices 102, or sensors thereof, can correspond to an indicator that is part of an indicator group. Thus, when IOT data is analyzed by the tagging component 128, the IOT data can be annotated with the indicator group with which the IOT data is associated. The indicator group can be determined, for example, by comparing an identifier for the IOT device that is included in the IOT data with a directory or mapping (which can be in the form of a table, such as a relational database table) that maps IOT device identifiers to one or more indicator groups.

An IOT device 102 can be associated with a particular piece of equipment, such as a pump, a piece of robotics, etc. The particular piece of equipment with which an IOT device 102 is associated can be indicated by an equipment ID attribute, which can represent another piece of metadata used to tag IOT data. A given piece of equipment may be associated with a particular type, which can be indicated by a model ID attribute with which IOT data can be annotated. In turn, a number of models for a particular type of equipment may have common components or functionality, and so a template ID attribute can be used to indicate a set of one or more attributes that are relevant to a particular model falling with the template. In other words, attributes can be arranged in hierarchical groups, such as in the order of general to specific of template ID, model ID, equipment ID, and indicator group (along with an identifier of the actual IOT device 102/sensor that transmitted the IOT data).

Other types of metadata that can be added to IOT data by the tagging component 128 can include a tenant identifier, if data is maintained in a multitenant system, or otherwise an identifier for a particular client, system, or application that is to receive the data. Other metadata elements can be used to tag IOT data with information like aggregation or data handling policies, including whether data should be encrypted is or should be protected (e.g., is confidential or privileged).

FIG. 2A illustrates an example of a raw, untagged IOT data message 200 from an IOT device 102. FIG. 2B illustrates a tagged IOT data message 250 that corresponds to the IOT data message 200 of FIG. 2A after being processed by the tagging component 128. Note that the untagged IOT message of FIG. 2A can represent the IOT data after having been subject to processing/formatting/annotation by upstream processes/component. For example, the IOT message of FIG. 2A is shown as in JSON (JAVASCRIPT OBJECT NOTATION) format, whereas the data from an actual IOT device may have been in a different format (e.g., string, XML, characters, CSV). In some cases, the IOT device 102 can natively send messages in JSON format, but the contents can optionally be augmented or reformatted (e.g., key names changed in key/value pairs).

It can be seen that the tagged IOT data message of FIG. 2B removes some data elements (e.g., thingId, thingType) of the untagged message, and adds other elements, including tags 254, an "identifier" 258, and a "structureid" 262. While the tenant metadata element is present in both FIG. 2A and FIG. 2B, in other cases the tenant identifier can be determined when processing the untagged IOT data message 200 and added during the tagging/annotation process that produces the message 250.

In order to perform tagging, the tagging component 128 determines, for a given IOT data message, what set of attributes (metadata elements) to apply and what values to be used with a specific message. As the set of attributes can potentially be applied to IOT data messages from many IOT devices 102, the set of attributes to be used with a given IOT device is typically maintained by the tagging component 128. Referring back to FIG. 1, data elements in the untagged IOT data message, such as thingID or thingType, can be compared with a property set mapping 132 to determine a property set 136. In other cases, the untagged IOT message 200 includes an identifier for a property set 136 or includes a set of properties to be used for tagging, where values for the properties are obtained during an annotation process.

Although a set of properties to be used in tagging untagged messages from the IOT devices 102 may be consistent for at least a subset of the devices, the actual values to be used with the tags can vary more widely, including in some cases having different IOT devices, even of the same type, associated with different values for a given metadata element. When an untagged message is being processed by the tagging component 128, the tagging component can determine what properties will be used to tag the message (e.g., from the property mapping 132/property sets 136). The values to be used with the properties can be obtained from one or more external sources, such as using REST APIs 140.

In some cases, the REST APIs 140 can include methods for different external sources or different property sets 136. In other cases, the REST APIs 140 can be more general. Arguments provided in a call to a REST API 140 can depend on the implementation of the API. If the REST API 140 is more specific, providing an identifier for the given IOT device 102 (or a set to which the IOT device belongs) can be provided as the argument. If the REST API 140 is more general, calls to the API can also include identifiers for specific properties whose values are to be retrieved, along with an identifier for the relevant IOT device 102/IOT device group.

Using the REST APIs 140 can be time and resource intensive. Accordingly, the ingestion service 120 can include a cache 144 to store property/value information. When the tagging component 128 analyzes an untagged message, after determining what properties should be used to tag the message, the tagging component 128 can consult the cache 144 to determine if the needed values are stored in the cache. If so, the tagging component 128 can retrieve the values from the cache 144 and tag the message. The cache 144 can optionally be updated to reflect that the values were accessed, and optionally information such as an access time. Maintaining information regarding retrieval of values from the cache 144 can be useful with certain cache management strategies (e.g., least-recently used, least-frequently used).

If the needed values are not present in the cache 144, the tagging component 128 can request the values using the REST APIs 140. When the REST APIs 140 obtain the values, the values can be stored in the cache 144, along with being returned to the tagging component 128.

After being tagged, the messages can be sent by the ingestion service 120 to a hyperscale computing system 150, which can be a cloud-based data storage and processing service (e.g., AMAZON WEB SERVICES, MICROSOFT AZURE, GOOGLE CLOUD PLATFORM), such as by a writer 148. As will be further explained in Example 3, the hyperscale computing system 150 can perform operations such as storing raw, tagged messages from the ingestion service 120, performing aggregations, storing aggregates, and notifying other components of a data processing pipeline that new aggregates are available (e.g., notifying a component of a relational database system that aggregates are available to be written to the database system). Although described as being sent to a hyperscale computing system 150, in other embodiments, the tagged message can be sent to another type of system for storage or further processing.

As will be further described in the following Examples, the hyperscale computing system 150 can produce aggregates that are written to a data store 158 of an analytics platform 154 as timeseries data 162. The timeseries data 162 can be converted to, and stored in, a structured format, such as in a relational database table. The data store 158 can also store master data 166, which can be combined with the timeseries data 162 for analysis. The master data 166 can correspond to master data 174 of one or more applications 170. Later Examples describe how the master data 174 can be obtained from the applications 170, and optionally converted for use with the analytics platform 154.

As will also be further described, a client 180 can access the analytics platform 154, such as to perform data analysis, as well as to configure various aspects of the computing architecture 100. For example, the client 180 may issue commands to alter how data is processed by the ingestion service 120 or stored in, or processed by, the hyperscale computing system 150. The client 180 may cause changes to the master data 174, which in turn may be propagated to the master data 166.

Figure 3:
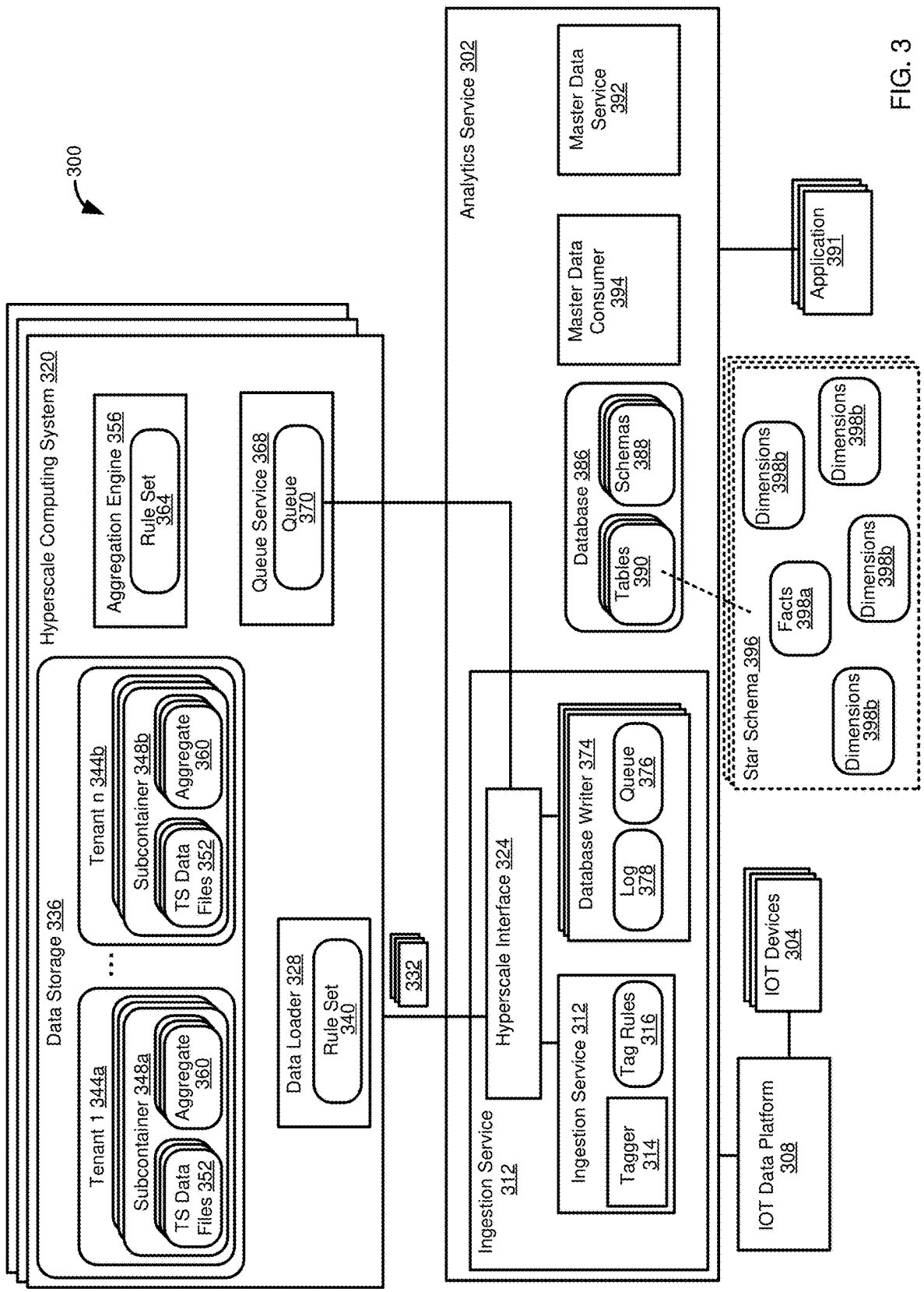
FIG. 3 is a diagram of a computing environment in which disclosed technologies can be implemented, where the computing environment facilitates writing of data from IOT devices, or produced therefrom, stored in a hyperscale computing system, to an analytics platform.

Example 4)—Example Interaction of IOT Data Processing Pipeline with Hyperscale Computing System FIG. 3 illustrates a computing architecture 300 that can be used to migrate IOT data into a database system. The computing architecture 300 includes an IOT data platform 308 that sends data received from IOT devices 304 to an ingestion service 312. The ingestion service 312 can be part of, or otherwise interact with, an analytics service 302 that facilitates analysis of IOT data.

The IOT data platform 308 can be the data streaming service 114 of FIG. 1, while the ingestion service 312 can be the ingestion service 120. For convenient presentation, the ingestion service 312 is only shown as including a tagger 314 (e.g., the tagging component 128) and tag rules 316 (which, for example, can include one or more of the property set mappings 132, property sets 136, cache 144, and REST APIs 140 of FIG. 1).

The ingestion service 312, which can also be referred to as an IOT data consumer, interacts with a hyperscale computing system 320, which can be the hyperscale computing system 150 of FIG. 1. As in the description of Example 2, in other implementations components of the hyperscale computing system 320 can be included in a non-hyperscale system. In addition, rather than being separate from a system that implements an ingestion pipeline (which includes the ingestion service 312 and other components that will be further described), functionality provided by the hyperscale computing system 320 can be incorporated into a computing system that implements the ingestion pipeline.

In some cases, the ingestion service 312 interacts with a fixed API that in turn interacts with the hyperscale computing system 320. However, it can be beneficial to allow the ingestion pipeline to flexibly work with multiple hyperscale computing systems 320 (or computing systems providing equivalent functionality). Accordingly, the ingestion service 312 may interact with one or more hyperscale computing systems 320 using (e.g., by making calls to) a hyperscale interface 324, where the hyperscale interface processes a call and sends a formatted request to a hyperscale computing system 320. The hyperscale interface 324 presents methods for performing various operations on a hyperscale computing system 320, such as to write data to the hyperscale service, to read data from the hyperscale service, to determine if new data (e.g., aggregates) is available at the hyperscale service, or to configure the hyperscale service.

The hyperscale interface 324 contains implementations of the provided methods for various hyperscale services 320 that might be used by the ingestion service 312 or other components of an ingestion pipeline. For example, the ingestion service 312 may be initially configured to work with AMAZON WEB SERVICES as the hyperscale computing system 320, and so the hyperscale interface 324 implements write, read, check for data, and configuration methods for AMAZON WEB SERVICES. At a later time, it may be desired to also process data using MICROSOFT AZURE, and so the hyperscale interface 324 can be updated to implements its methods for this platform. However, since the ingestion service 312 and other components of the ingestion pipeline access the hyperscale interface 324, they may not need to be modified (or can be modified less extensively) to operate with a new hyperscale computing system 320.

Data sent from the ingestion service 312 to the hyperscale computing system 320, such as through the hyperscale interface 324, can first be processed by a data loader 328 (which can also be referred to as a data ingestion component or a streaming data service). The data loader 328 can perform actions to store data, such as tagged IOT messages 332, in data storage 336 of the hyperscale computing system 320. Actions performable by the data loader 328 include batching (e.g., waiting until a threshold number of messages are reached and then writing the batched messages to data storage 336), compression, and encryption. In a particular example, such as when AMAZON WEB SERVICES is used as the hyperscale computing system 320, the data loader can be the FIREHOSE application.

The data loader 328 can access a rule set 340. The rule set 340 can store configuration information for how various types of IOT messages 332 should be processed, such as identifying a tenant container 344 (shown as 344*a*, 344*b*) in which data should be stored, and optionally a subcontainer 348 (shown as 348*a*, 348*b*) where data will be stored (e.g., a storage path, such as a file path). In some cases, subcontainers 348 can be used for particular groups of devices or sensors (e.g., indicator groups), where the groupings can be formed based on criteria such as sensors having a common purpose, a common sensor type (e.g., pressure data, temperature data), belonging to a same piece of equipment or category of equipment, or having a common location. Data, such as the tagged messages 332, can be stored in timeseries data files 352.

Although timeseries data files 352 can be organized in a variety of ways, in a particular example, the data store 336 uses a storage or partitioning scheme where messages 332 (IOT data) are partitioned by tenant, year, month, and day. Data files representing hourly data are stored in the path (e.g., folder) for each day. Optionally, the data files 352 can be further partitioned by another subcontainer 348, such as a category as described above.

Data files 352 are processed by an aggregation engine 356. The aggregation engine 356 can periodically determine when new data files 352 are available for processing. In some cases, the aggregation engine 356 can be set to determine whether data files 352 are available according to particular schedule, such as hourly. However, it may be useful to check for data files 352 at other times, or to check for data files upon request (e.g., a request by an end user or by a software process). As will be further explained, in some implementations, the ingestion pipeline and hyperscale computing system 320 can be configured to process late arriving data (e.g., data that may be sent late because of a connectivity issue with a particular sensor). Checking for data files 352 at more frequent intervals or upon demand can allow late data to be more quickly processed.

The aggregation engine 356 generates one or more aggregate values from the tagged, individual data measurements stored in the data store 336. In particular, the aggregation engine 356 can generate aggregate values over the time period represented by a particular timeseries data file 352 being processed—in this example, hours. Aggregate (or composite) values generated by the aggregation engine 356 can include values such as count, sum, minimum, maximum, average, median, standard deviation, etc. The particular aggregate values generated can be fixed, or can represent a default set, or can be customized, such as in response to requests received through the hyperscale interface 324.

It can be beneficial to store information that may allow aggregates to be revised, even if the base files 352 have been deleted or are otherwise not available. For example, by maintaining count information (i.e., the number of data points in an aggregate), aggregate values such as average can be updated by weighting the new readings appropriately.

Aggregated values can be written by the aggregation engine 356 back to the data store 336 as aggregates 360. In some cases, the aggregates 360 can be stored in the same schema as used for the timeseries data files 352. In other cases, the aggregates 360 can be stored in a different schema. In particular, it may be desirable to aggregate data for particular indicator groups. So, for example, if the tagged messages 332 are stored by tenant/year/month/day, the aggregates 360 can be stored by tenant/indicator group/year/month/day or tenant/year/month/day/indicator group.

The aggregation engine 356 can include a rule set 364. The rule set 364 can define different parameters that will be used for processing different types of data files 352. For example, different tenants 344 may choose to have different aggregate values calculated, to have aggregates generated at differently frequencies (e.g., every half hour or every six hours rather than a default setting of hourly aggregations). The rule set 364 can also define whether data in a data file 352 is further partitioned for aggregation (e.g., generating overall aggregate values for a file in addition to, or in place of, generating aggregate values based on indicator groups or other grouping criteria).

When a new aggregate 360 has been created, the aggregation engine 356 can push a notification to a queue service 368 than can maintain one or more queues 370. In some cases, the queue 370 is a first-in first-out (FIFO) queue. However, other types of queues, including priority queues, can be used if desired.

A database writer 374 of the ingestion pipeline can periodically check the queue 370 to determine whether new aggregates 360 are available for processing. In some cases, a plurality of database writers 374 are available for writing aggregates 360 to a database 386 of the analytics service 302. The database writer 374 can call a "check for new data" method provided by the hyperscale interface 324. If a new aggregate 360 is available, information about the aggregate can be dequeued from the queue 370 and sent to the database writer 374. The information about the aggregate 360 can include an identifier for an aggregate and a location from which the aggregate can be retrieved.

The database writer 374 can retrieve data for the aggregate 360 by calling a "read data" method provided by the hyperscale interface 324. The database writer 374 can then write the data to the database 386, as will be further described, to one or more database tables 390 having one or more schemas 388. Each database writer 374 can include a job (or task/element) queue 376 to which a task to write an aggregate can be enqueued after receiving the task from the queue 370. Each database writer 374 can include a log 378 that is used to persistently record jobs associated with the database writer 374, such as in case a job fails or the ingestion service 312 experiences a failure. In other cases, a common log 378 can be used for all of the database writers 374.

The tables 390 of the database 386 can include master data in addition to timeseries data associated with the aggregates 360. Master data can be obtained from one or more applications 391 by a master data service 392, which can then be processed by a master data consumer 394 to format and write the master data to the database 386, as will be further described.

In some embodiments, the tables 390 can be arranged in star schemas (or snowflake or similar schemas) 396, where a star schema includes a fact table 398a, corresponding to the timeseries data, and dimension tables 398b, which contain master data. In some cases, multiple dimension tables 398b can be combined (e.g., denormalized) into a single table to facilitate data processing (such as for OLAP queries or queries that otherwise perform analytics on the timeseries data).

Example 5)—Example Aggregate Notification Message

FIG. 4 is an example message 400 that can be retrieved by the database writer 374 from the queue 370. The message 400 represents a message in JSON format using AMAZON WEB SERVICES as the hyperscale computing system 320. The message 400 includes a time 404 the event was added to the queue 370, which is typically substantially contemporaneous with the completion of an aggregate 360. The message 400 also includes a file location 412, which is shown as including a file path 414 that includes date information 416 and an identifier 418 of an indicator group associated with the aggregate available at the location.

The message 400 can include additional information used for obtaining or processing aggregates. For example, an account identifier 422 can be used to associate an aggregate with a specific user or process, including so that the aggregate can be written to the appropriate tenant storage of a multitenant database system.

Example 6)—Example Writing of Aggregates to Relational Database

With reference again to FIG. 3, when a database writer 374 has availability, it can consult the hyperscale computing system 320 to determine if new aggregates 360 are available for processing (e.g., by calling a "check for aggregates" method of the hyperscale interface 324). If a new aggregate 360 is available, the corresponding element of the queue 370 (aggregate notification) is dequeued and sent to the requesting database writer 374. In some implementations, the hyperscale computing system 320 maintains a log of dequeued elements, at least for a period of time, to facilitate recovery in the event of an error or system outage, such as a network error in sending the aggregate notification to the database writer 374.

When the database writer 374 receives an aggregate notification, the notification is added to its job queue 376. The notification, or an overall status of the job queue 376, can be persisted as entries in the log 378. As described in Example 3, in some cases, the log 378 maintains records of jobs/job status for all database writers 374. In other cases, separate logs 378 can be maintained for each database writer 374. In the event of a system failure or error, the logs 378 can be read to assign uncompleted jobs (retrieving aggregates and writing them to tables of a database system) to database writers 374.

After adding a job to its job queue 376, and persisting the job in the log 378, the database writer 374 retrieves the aggregate 360 corresponding to the job, such as by requesting the data from the hyperscale computing system 320 (e.g., using the hyperscale interface 324). The database writer 374 then proceeds to write the data for the aggregate 360 to the database 386. Generally, the writing of the aggregate 360 to the database 386 by the database writer 374 converts the IOT (timeseries) data, now in aggregated form, from a semi-structured format (e.g., XML, JSON, CSV) to a structured format in the form of data stored in one or more relational database tables 390.

Example 7—Example Database Schemas for Storing IOT Data

The present disclosure provides a schema definition process that can flexibly allow new tables to be added when new types of aggregates are to be stored in a database (e.g., the database 386 of FIG. 3), and for table formats to be modified when changes to aggregate definition (e.g., for an indicator group) are received. As will be further described, table schemas can be defined in terms of indicator groups. Thus, since aggregates can be defined based on indicator groups, the definition of a table schema can correlate to the definition used for an aggregate to be stored in a table according to the table schema.

Having table schema definitions correlate with aggregate definitions can have a number of advantages. One advantage is that a table schema can be more easily adapted when a change to an aggregate definition (e.g., an indicator group associated with the definition, such as adding sensors to an indictor group or removing sensors from an indicator group) is made. Since table definitions are consistent with aggregate definitions, new tables can be more easily created when new aggregates (e.g., for new indicator groups) are created.

Another advantage of using aggregate definitions as a basis for table schemas is that multiple database writers can more easily operate concurrently. That is, database writers that are writing different aggregates will generally be writing to different tables, so that the chances of one database writer having to wait for table locks to be released by another database writer can be reduced. Since aggregates are generally created according to a schedule, generally one aggregate for a given set of IOT devices (or individual sensors thereof) will be written to the database before a next aggregate for the same set of IOT devices is to be processed.

Figure 5:
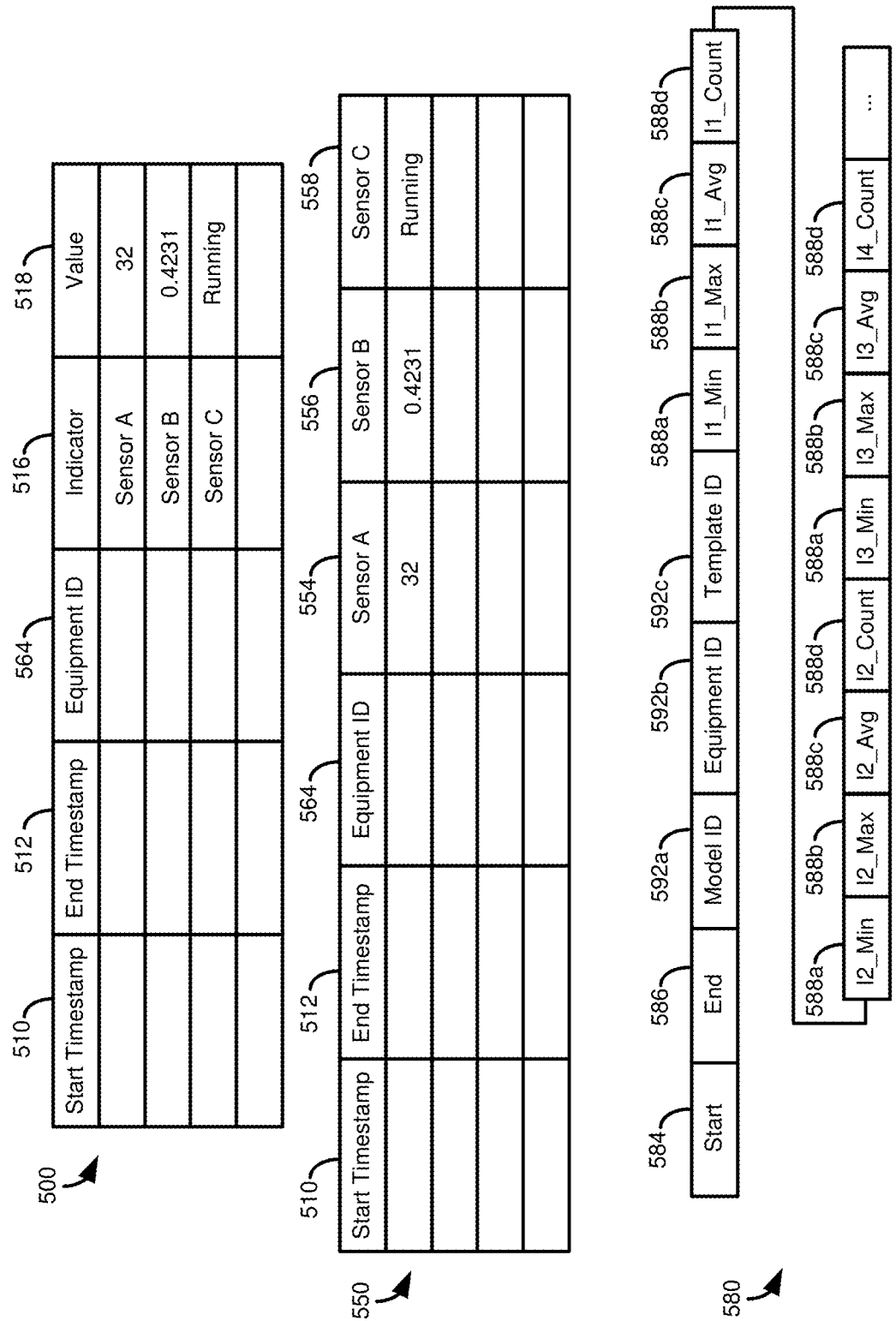
FIG. 5 illustrates various table schemas that may be used to store data from IOT devices, or produced therefrom.

FIG. 5 illustrates two example table schemas 500, 550 that can be used to store aggregate data. Both table schemas 500, 550 include columns 510, 512 that provide time information for a given row of the table. As shown, the columns 510, 512 represent start and stop timestamps, respectively, for sensor readings in the aggregate. However, an aggregate time period can be recorded in another manner, such as having a single column that represents an aggregate generation time, an initial reading time, or a last reading time.

Table schema 500 incudes a column 516 that identifies what sensor (in an indicator group for a given table having the schema 500) has a particular reading value in a column 518. Note that in this case a given aggregate (i.e., for a particular time, representing a particular write session/job by a database writer 374) can have multiple records (rows) in a table having the schema 500. Assuming that an indicator group for a particular instance of the table schema has three indicators, A, B, and C as shown, three rows would be used, corresponding to an aggregate value of that indicator of the given indicator group for a given aggregate (e.g., result of an aggregation operation, where the aggregate may include separate aggregate values for indicators in a given indicator group).

In contrast, the table schema 550 is defined so as to include a column for each indicator in the indicator group represented by a given instance of the table schema. So, using the example scenario provided for the table schema 500, the table schema 550 includes columns 554, 556, 558 for each sensor in an indicator group, where each column stores aggregate values for the respective sensor. Use of the schema 550 can provide a number of advantages as compared with the schema 500, even though both schemas can provide the benefits described above in terms of adaptability (ease of creation/modification) and parallelism as described above.

One issue that can arise through the use of the table schema 500 is that data type information may be lost if different indicators in a group provide measurements in different datatypes. Consider the three-sensor example that has been described. If the sensors have data types of float, time, and string (either a string datatype or a fixed or variable length collection of characters), putting all of the sensor data in a single column would typically require the use of a datatype that can be used to represent all of those values—such as a string/character array. However, in that case, in order to use values of individual sensors that were originally not in string/character format, the values would need to be converted to the appropriate data type for processing. For example, if float values for sensor B were converted to a string/character array for storage in column 518, the values may need to be converted from string/character array back to float values for calculation, or even for queries (e.g., queries for values greater or less than a specified value). As the column 518 may also have a wider domain of values, and fewer frequently occurring values (or fewer longer runs of the same value) opportunities for data compression, such as dictionary encoding, the column 518 may exist, making the column/table less compressible.

On the other hand, by providing different columns for each sensor, data for each sensor in an indicator group can be stored in its native datatype in tables having the schema 550, making the data more useable. In addition, data maintained in the schema 550 can be more highly compressible, since a given column 554, 556, 558 may be expected to have a smaller domain of values/more frequently repeating values. This compressibility can be particularly useful when data is stored in a column-store format (e.g., data is stored by column for multiple records, rather than storing all columns for a single record together).

The advantages provided by the schema 550 do not reduce the adaptability/ease of table creation for indicator groups with respect to the schema 500. In the schema 500, if a new sensor is added to an indicator group, the new indicator and its values can simply be added as entries to the columns 516, 518. If a sensor is removed from an indicator group, records for the relevant sensor can optionally be removed from the table having the schema 500. Alternatively, the data can be left in the table, but logically made unavailable for queries. For example, the definition of an indicator group can be used in processing a query (e.g., by joining a table having indicator group definitions with a table having the schema 500). If the sensor is not included in the indicator group definition, its data will not be retrieved from the table having the schema 500.

With the table schema 550, new sensors can be added to an indicator group by adding a new column to the table for the sensor, having the appropriate datatype for the sensor. If a sensor is removed, the relevant column can be dropped from the table having the table schema 550. Or, as with the table schema 500, when a sensor is removed from a table having the schema 550 the relevant column is not deleted from the table (at least not initially), but the data is made logically unavailable, such as described above.

A database writer, or other component, can issue appropriate DDL (data definition language) to create and modify the tables schemas 500, 550 for a given table. For example, if the table schema 500 is used, a standard table can be created having the table schema 500, since the sensor will share the same column 518 for data values and the identity of the sensor will be provided in column 516. In the case of the table schema 550, a CREATE TABLE DDL statement can be used to define standard columns (e.g., timestamps associated with a given aggregate value) and columns for each sensor in the definition of the indicator group used for table creation. If a sensor is to be added to a table having the schema 550, an ALTER TABLE command can be used to add a column for the added sensor. If a sensor is removed from an indicator group, and its data is to be removed, an ALTER TABLE can be issued to drop a column from the table.

In some cases, if a table is altered to include a new column, the table only includes data for newly written data. That is, for example, if a new column is added for a table having the schema 550, data values are not added to the table for existing records in the table. In other cases, NULL values can be added to existing table records. In yet further cases, at least if the relevant data is available, such as in a hyperscale computing system, a database writer or other component can send aggregation requests or data requests to the hyperscale computing system. If the relevant aggregate was already calculated, it can be retrieved by the database writer and written to the table. If the relevant aggregate was not calculated, and the individual sensor data is available, the aggregate value can be calculated and provided to a database writer. For example, once the aggregation has been completed, a message that a new aggregate is available can be placed in a queue for retrieval and processing by a database writer, as described in Example 3.

The addition of sensors to an indicator group having data stored in a table having the schema 500 can be handled in an analogous manner to the schema 550. That is, in some cases, records for a given added sensor are not added for aggregation events already reflected in the table. In other cases, records for an added sensor are added for existing aggregation events, either as having NULL values or by obtaining/calculating aggregate values as described for the table schema 550.

The table schemas 500, 550 have been primarily described as having columns that identify a particular aggregation event and how sensor readings for particular sensors are recorded. However, the table schemas 500, 550 can include columns that provide other information, including values that correspond to tags (otherwise referred to as metadata elements, labels, attributes, properties, etc.) added to data received from an IOT device by a tagging component (e.g., the tagging component 128 of FIG. 1 or the tagging component 314 of FIG. 3), and which may also be included in aggregated values for that IOT device (or a particular sensor of a particular IOT device). For example, both schemas 500, 550 include a column 564 for "Equipment ID," which can represent an attribute whose value is adding by the tagging component 128, 314.

FIG. 5 illustrates a table 580 having a modified version of the table schema 550. That is, the table 580 includes columns 584, 586 identifying an aggregation time period and columns 588 (shown as 588a-588d) representing various types of aggregate values for various sensors in the indicator group represented by the table 580. In particular, each sensor (I1, I2, etc.) is shown as having a column 588a representing a minimum observed value during the aggregation period, a column 588b with a maximum observed value during the aggregation period, a column 588c providing an average value during the aggregation period, and a column 588d providing a count of readings recorded during the aggregation period (other otherwise used in calculating aggregate values, such as the values represented by the columns 588a-588c).

Although each indicator is shown as having a set of columns 588a-588d, in other embodiments different sensors can be associated with more, fewer, or different aggregate values than other sensors. For example, minimum and maximum values may not be relevant to a sensor that returns a Boolean value representing a status (e.g., on or off, operational or not). Even for the same type of sensor data (e.g., pressure, temperature, etc.), different aggregate values may be desired for different indicator groups or even individual sensors of the same indicator group. That is, for one temperature sensor minimum, maximum, and average values may be desired, but for another temperature sensor only the minimum value may be of interest. Tailoring a table schema to the particular aggregate types that are relevant to a particular sensor can reduce the amount of data needed to be stored in a given table, as well as reducing processing in generating the aggregate and network resources in sending the aggregate.

The table 580 includes columns 592 (shown as 592a-592c) that represent values added by a tagging component when IOT messages from IOT devices are processed prior to aggregate values being generated, such as having a column 592a storing a model identifier, a column 592b storing an equipment identifier, and column 592c storing a template identifier, as those identifiers were described in Example 2. As discussed, other tags applied to IOT data, including aggregates calculated from individual sensor readings, can be used in determining to what table data should be written (including determining that a new table is required, instantiating the table, and then writing data to the table), such as using a tenant identifier to identify a particular database container for the data and identifying a particular table in that container using an indicator group identifier.

Example 8—Example Processing of Late or Updated Aggregates

Disclosed technologies can facilitate to the processing of data from one or more sensors in an indicator group that might be received after an aggregate for an indicator group associated with such sensors has been calculated, and optionally added to a database table for the indicator group. When new sensor data arrives, an aggregate can be calculated for the sensor data, such as using the techniques described in Example 3. According to the previously described process, the aggregate can be stored in a hyperscale computing system and a notice enqueued indicating that a new aggregate is available for writing. If the newly received sensor data does not have an existing calculated aggregate, the aggregate can simply be calculated and stored as described.

If an aggregate for the newly received data has already been calculated, a new aggregate can be calculated and stored (optionally replacing the earlier-calculated aggregate). Re-calculation of an aggregate can be facilitated by maintaining disaggregated data for a period of time. In the event the disaggregated data is not available, or in the event that it may be more efficient, at least some types of aggregate values can be updated based on prior aggregate values. For example, minimum and maximum values can be updated if newly received sensor data has higher or lower values than originally processed data. Average values can be updated using a previously recorded count, and the count then updated.

When a database writer processes an aggregate, it can first check to see whether at least some of the data in the aggregate represents previously written data. If so, overlaps can be resolved by updating the stored values with the values in the updated aggregate. If the aggregate does not overlap with existing data, or for any portion of an aggregate that does not overlap with existing data, the database writers can add new records to the appropriate database table.

Example 9—Example Ingestion of Master Data into Analytics Platform

Data from IOT devices, including aggregated data, can be referred to as timeseries data. While timeseries data can provide a variety of insights and be the basis for a number of different actions, typically it needs to be combined with other types of data in order to enable suitable processing or to assist in result interpretation. Data that provides semantic meaning to timeseries data, including for organizational or processing purposes, can be referred to as master data. It can be beneficial to facilitate obtaining relevant master data, storing the master data in a form that allows for efficient processing, and storing data in a manner such that the master data can be combined with appropriate timeseries data.

One benefit of the processes described in Examples 1-8 is that timeseries data can be stored in a relational format. Master data is commonly stored in a relational format, and so can be easily processed along with the timeseries data. In some cases, master data and timeseries data can be stored in the same relational database system, while in other cases data federation or other techniques can be used to retrieve data from another database system. However, for efficient processing, it can be useful to store the master data and the timeseries data on the same system.

It is increasingly common for organizations to move some or all of their data processing and storage to cloud or third party environments. For example, an organization may have a on-premise database system that is used to store master data and optionally other types of data, such as transactional data (e.g., for an OLTP system). Particularly given the volume and pressure of data associated with IOT applications, many organizations choose to use third party services to receive, process, and store IOT data, including IOT data processed for storage in a relational database system.

Regardless of whether master data is stored remotely from timeseries data, issues can arise when trying to combine master data with timeseries data. For example, master data can be quite extensive—being stored in many tables, each with many attributes. Only a relatively small portion of this master data may be relevant to/needed for performing analytics on timeseries data. In addition, master data is typically stored in a schema that is useful for other purposes, such as OLAP analysis, but not be efficient for combination with timeseries data and IOT data analysis.

Figure 6:
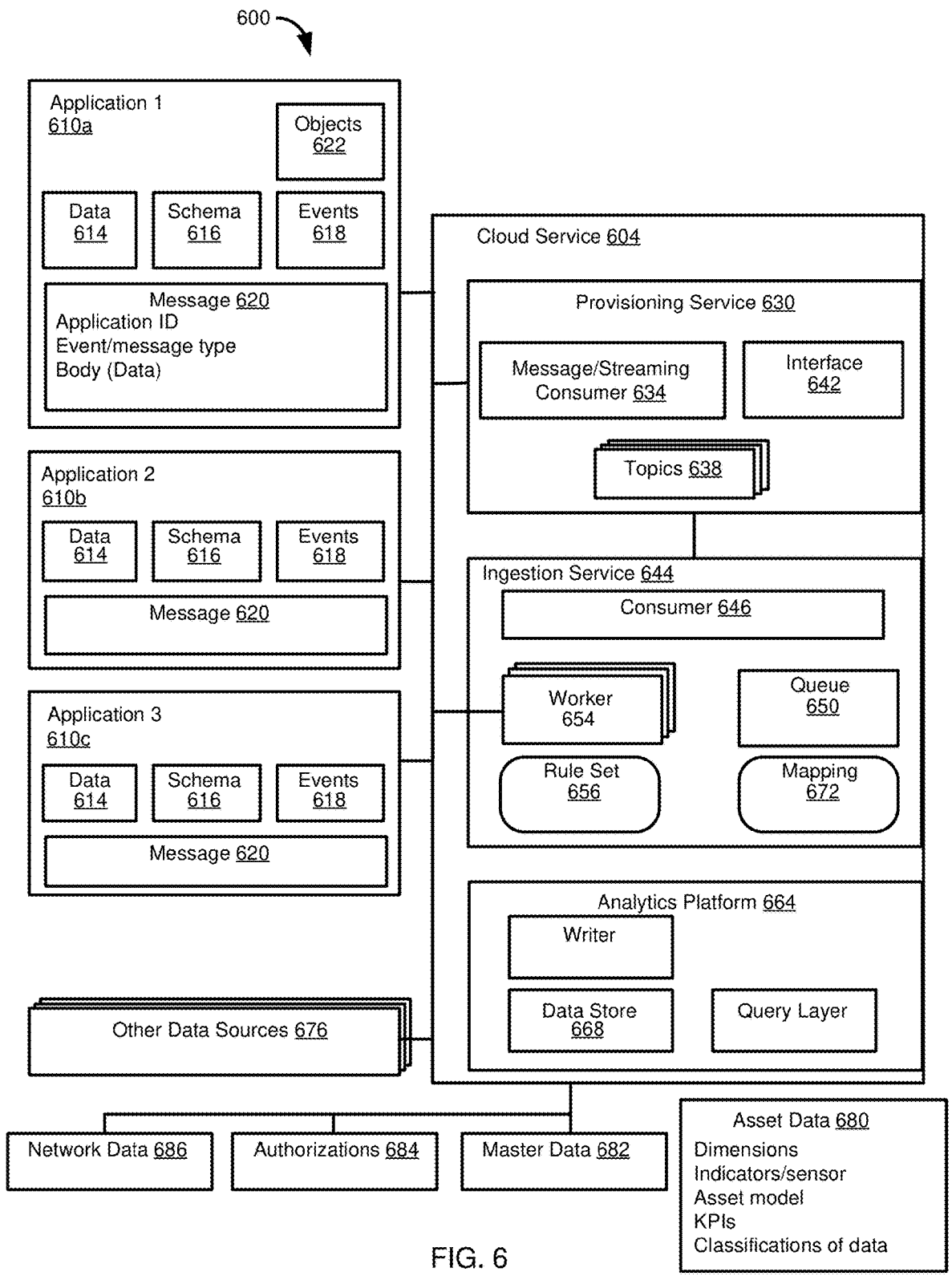
FIG. 6 is a diagram of a computing environment in which disclosed technologies can be implemented, where the computing environment facilitates storage of application master data on an analytics platform, where it can be combined with timeseries data generated from IOT devices.

FIG. 6 illustrates an example computing architecture 600 that can be used to obtain and store master data, including for combination with timeseries data for IOT data analysis. The computing architecture 600 generally shows a plurality of applications 610 (shown as 610a-610c) in communication with a cloud service 604 (or hyperscale computing system) that provides for analysis of IOT data. As shown, the applications 610 and the cloud service 604 are separate systems. In other implementations, some or all of the applications 610 may be located on the cloud service 604. Further, although FIG. 6 and the techniques described in this Example 9 use a cloud service 604, the disclosed techniques can be implemented in an analogous manner using a non-cloud based system.

Each of the applications 610 includes data 614, at least part of which is master data, a schema 616 used to store the master data, and events 618 that are generated by the application. At least some of the applications 610, such as application 610a, can include objects 622. An object 622 can store, or refer to, the data 614, as well as optionally containing additional data that is not part of the data 614. An object 622 can be a logical data object, such as a BusinessObject, as implemented in products available from SAP SE, of Walldorf, Germany. Objects 622 can have particular types (e.g., customers, vendors, equipment types, etc.), and can be related to data 614 through techniques such as object-relational mapping. Logical data objects are further described in U.S. patent application Ser. No. 16/865,021, filed May 1, 2020, incorporated by reference herein.

Events 618 can be used to send master data, including updates to master data, to the cloud service 604. In particular, events 618 can trigger a message 620 that is sent, or at least made available, to the cloud service 604. A message 620 can include data 614 that is relevant to an event, or information that can be used by the cloud service 604 to obtain relevant data 614 or other data, or can include information about how data 614 or other data should be processed. Data 614 can influence how data 614 for a message 620 can be processed, or actions taken in response to the message 620. For example, the message 620 can include an identifier for the application 610 that generated the message, an event/message type, along with a message body, which can include relevant data 614.

A given type of event 618 can be associated with a particular message type/message contents. Event types can include events 618 such as adding, deleting, or modifying either a schema 616 or values for a particular instance of the schema (e.g., a particular table that stores data 614). Events can also be triggered based on changes to objects 622 (e.g., adding, deleting, or modifying an object). So, an example of the content of a message 620 can be "Add attribute X to schema Y for application Z" or "Update attribute value X to value Z for application Z."

Messages 620 can be received by a provisioning service 630 of the cloud service 604. In some cases, an application 610 and the provisioning service 630 can have a publisher-subscriber relationship. In other cases, the provisioning service 630 can periodically poll applications 610 to determine if new messages are available. In such an implementation, an application 610 can maintain a message queue (not shown) that can be accessed by the provisioning service 630, such as through an API (not shown). A suitable message/ streaming service that can be used by the provisioning service 630, and/or an application 610, is KAFKA (Apache Software Foundation).

As shown, the provisioning service 630 includes a message/streaming consumer component 634 that initially receives messages 620 from the applications 610. The messages 620 can be stored by the consumer 634 in an appropriate topic (e.g., a container) 638. Topics 638 can serve to organize messages 620 based on criteria such as event/message type or message source (e.g., application 610). The provisioning service 630 also includes an interface 642, which can allow external components to obtain information (e.g., messages 620 or contents thereof) from a particular topic 638.

Messages 620 can be retrieved from the topics 638 by an ingestion service 644. In particular, the ingestion service 644 can include a consumer component 646 that periodically polls the provisioning service 630 for new, or otherwise unprocessed, messages 620. The consumer component 646 can communicate with the provisioning service 630 using the interface 642.

Messages 620 retrieved by the consumer component 646 can be placed in a queue 650. One or more workers 654 can dequeue one or more messages 620 for processing. In some cases, messages 620 are not immediately dequeued, but marked as in process. The messages 620 can be dequeued permanently when a worker 654 completes processing of a message. Workers 654 can be configured to retrieve queued messages 620 that are not marked as in process. In other cases, fault tolerance can be provided for the ingestion service 644 by logging messages 620 placed into, or retrieved from, the queue 650. The consumer component 646 can write to the log (not shown) when a message 620 is enqueued, the queue 650 can be configured to write to the log upon enqueue or dequeue of a message, or a worker 654 can write a log entry when it dequeues a message.

If a worker's 654 attempt to process a message 620 fails, the message can be placed back into the queue 650 or, if the message was not dequeued (and instead, for example, marked as being in process), the status of the message can be changed to indicate that it is not in process. In either case, the queue 650 can track a number of times processing of a message 620 has been attempted. If a message 620 is unsuccessfully processed a threshold number of times, the message can be dequeued and a notification can be sent, such as to a user or administrator, so that the failure can be addressed.

One advantage of the described interaction between the applications 610, the provisioning service 630, and the ingestion service 644 is that it allows for asynchronous, fault tolerant processing of messages 620. That is, messages 620 can be retrieved from the provisioning service 630 as workers 654 have processing capacity (which, in some cases, can be reflected by a number of unprocessed messages in the queue 650). Similarly, workers 654 can retrieve messages 620 from the queue 650 as they have finish jobs/have processing capacity. The asynchronous nature of the processing helps improve fault tolerance/system resiliency, as, for example, if one or both of the provisioning service 630 or the ingestion service 644 are temporarily unavailable the system can resume processing without data loss when the respective service again becomes available. Fault tolerance/resiliency is also increased by having the queue 650 allow multiple attempts to process a given message 620, and by providing a notification if such processing repeatedly fails.

Processing messages 620 by the workers 654 can involve various actions depending on the nature/content of the message. Generally, the workers 654 can perform one or more of (1) causing data to be written to a data store 668 (e.g., a relational database system) of an analytics platform 664; (2) retrieving additional data to be written to the data store; (3) determining whether an action associated with the message is allowable; or (4) formatting data to be written to the data store.

As described in Example 3, the data store 668 can maintain both master data and timeseries data (e.g., as ingested according to the process described in Examples 1-3, or using another process). In some cases, master data can be written to the data store 668 (e.g., written to a table) for use with the timeseries data according to the relevant schema 616 of the application 610 that generated a message 620 associated with the data to be written. The data to be written is typically in a serialized format, but can be written to a schema in the data store 668 that is consistent with the corresponding schema 616. However, as described above, it can be useful to store data associated with a message 620 according to a schema other than the schema 616 from which any data may have been retrieved. In particular, it may be useful to store master data in the data store 668 in a manner that allows for efficient processing of the master data, including processing the master data along with relevant timeseries data (e.g., using SQL JOIN operations).

In some implementations, timeseries data and master data can be, or can be analogous to, a star or snowflake schema, where the timeseries data serves as a fact table and the master data serves as dimensions. Timeseries data can include suitable attributes, such as model ID, equipment ID, etc. to facilitate JOINs with master data, including master data that can be related to yet additional master data (e.g., model ID of the timeseries data is joined with model ID in a master attribute table, where one or more attributes of the master attribute table can be joined with tables holding additional master data).

One way storing master data in the data store 668 can be made more efficient is by storing the data in denormalized tables. Particularly when data is stored in a column store database, denormalization (e.g., storing master data for what might be multiple dimensions, and stored in separate tables for an application 610, in a single table in the data store 668), can reduce JOIN operations, which can be time consuming and computing resource (e.g., memory and processor use) intensive, as fewer tables need be joined in order to process a query. Accordingly, when data is written to the data store 668 a mapping 672 can be used to convert the master data from a source schema 616 to a target schema used with the data store 668.

In some cases, a message 620 may not include all of the information needed by a worker 654 to process the message. For example, a worker 654 may determine that additional data, such as asset data 680 or additional master data 682, should be written along with any data 616 included in the message 620. Or, rules for processing the message 620 may provide that one or more actions should be taken prior to processing the message, such as confirming that a particular action is authorized. The ingestion service 644 can include a rule set 656. The rule set 656 can define rules for processing different types of messages 620, for processing messages based on message contents (e.g., an application ID, information in the message body), or both.

A worker 654 can retrieve an appropriate rule from the rule set 656 for a given message 620. In the case where the rule indicates that additional data should be retrieved and written to the data store 668, the worker can contact the appropriate data source to retrieve the needed information. A data source can be an application 610, which can be an application that sent the message 620 being processed or another application. However, other data sources 676 can be used, such as other databases or information storage systems, or data can be retrieved from the data store 668. The applications 610 or other data sources 676, or a computing system or platform hosting such components, can provide an interface, such as an API, for a worker 654 to obtain information. Or, the worker 654 can communicate with the applications 610 or other data sources 676 (or relevant computing system or platform) using a suitable communication or data retrieval protocol, such as the SDA (smart data access), SDI (smart data integration), or BODS (BusinessObject data services) protocols used in products available from SAP SE, of Walldorf, Germany.

In a similar manner, data can be obtained by a worker 654 from an application 610, the data store 668, or other data source 676 for use in processing a message, in addition to, or instead of, the data being written to the data store 668. For example, authorization data 684 can be used to determine whether a particular action associated with a message, such as to add, update, or delete master data is authorized for a particular application 610, or a particular user thereof, that generated the event 618 that resulted in the message 620. In some cases, data to be retrieved by a worker 654, or written to the data store 668, in processing a message 620 can be data associated with another organization or entity. Or, the timeseries data with which data being written to the data store 668 in processing a message 620 will be used can be associated with a different entity. Network data 686 can be used to determine whether data sharing that will result from processing a particular message 620 is allowed. If the authorization or network data indicates that a particular action is allowed, the worker 654 can proceed. Otherwise, processing of the message 620 can be cancelled, optionally returning an error to the application 610 that generated the message, or to an administrator or end user associated with the timeseries data associated with the message 620.

FIG. 6 illustrates a writer 690 in the analytics platform 664, which can correspond to a database writer 374 of FIG. 3. Although a single writer 690 is shown, the analytics platform 664 can include a plurality of writers 690. The writer 690 can write timeseries data to the data store 668, as has been described. In some implementations, the writer 690 can perform other operations, such as writing master data to the data store 668. In addition, the writer 690 can optionally perform functions that have been described as performed by the ingestion service 664, such as converting master data from a schema 616 to a schema used in the data store 668, such as by using the mapping 672.

A query layer 694 can process queries involving one or both of timeseries data or master data stored in the data store 668. The query layer 694 can process queries that perform JOIN operations between timeseries data and mater data, including master data that defines for which indicators timeseries data should be retrieved and processed. For example, as has been described, removal of an indicator from an indicator group and make data for that indicator logically unavailable even if the data is still maintained in the data store 668, at least for a period of time. Queries processed by the query layer 694 can be more efficient using particular master data schemas, such as using a denormalized schema such that fewer JOIN operations are required during query execution.

Example 10—Example Messages for Master Data Changes

FIG. 7A-7H illustrate example messages 620 of FIG. 6 that can be sent by an application 610 and received by the provisioning service 630, in a specific implementation of the computing environment 600. FIG. 7A represents an example message 700 in JSON format to delete a particular object, such as a particular BusinessObject (or similar logical data object/other type of software object) identified by an objectid value 704. Note that in this case a message body portion 706 that contains data is empty. The message 700 includes an indicator 708 indicating a message/event type (in this case, delete), identifiers 710, 712 that identify a user and organization, respectively, associated with an event that triggered the message, and an identifier 714 for an owner of the object being deleted.

In some cases, when the message 700 is received, a worker processing the message can use information in the message, such as the identifiers 710, 712 for the triggering user and organization and the objectid value 704 to determine what information should be deleted from a set of master data stored for use with timeseries data, such as in the data store 668 of FIG. 6. In some cases, the attributes to be deleted can be maintained as part of a mapping, while in other cases a worker can contact a software application or other data source to obtain more information about the particular object being deleted (e.g., what attributes/properties it has), which can then be used to determine what information should be deleted. The information can also be used to determine whether a particular user/organization has sufficient permissions to delete the identified object. In making this determination, a worker can request additional information, such as access permission information, from an application or other data source.

FIGS. 7B-7D illustrate an example message 730 to create an object, such as a BusinessObject (or similar logical data object/other type of software object). The message 730 includes an objectid value 734, triggering user/organization identifiers 736, 738, and an object owner identifier 740. The identifiers 734-740 can be analogous to the identifiers 704, 710, 712, 714 of the message 700, and can be used for similar purposes (e.g., for determining whether a user/organization is authorized to create a new object/add corresponding data to a data store to be used with timeseries data).

As opposed to the body portion 706 of the message 700, a body portion 744 of the message 730 includes a variety of object attribute values 748. When a worker processes the message 730, it can determine whether all values needed for adding corresponding master data to be used with timeseries data are present in the message. If not, the worker can use a ruleset to determine what additional attributes are needed, and obtain the appropriate values from an application 610 or another data source. The worker can also determine what values 748 should be written to the data store and a location to which the values should be written, including consulting a mapping to determine an attribute of a table of the data store that corresponds to a value included in the body portion 744. Prior to obtaining/writing data, a worker can determine whether the request to create an object is authorized, which can occur in a similar manner as described above for the message 700.

FIGS. 7E-7H illustrates an example message 770 to update an object, such as a BusinessObject (or a similar logical data object/other type of software object). The message 770 can be generally similar to the message 730, in that it contains an objectid value 774, triggering user/organization identifiers 776, 778, and an object owner identifier 780, which can be similar to the identifiers 734-740. A body portion 784 of the message 770 include a section 788 listing old information for the relevant object, and a section 792 that provides new/updated information for the object. Prior to applying the update, which can otherwise be similar to a "create" operation (including authenticating the action), the section 788 can be used to confirm that data currently stored (e.g., master data for use with timeseries data) matches data in the update message 770. In some cases, an error can be raised if the current data does not match the data in the section 788 of the message 770. Or, the old information can be used in processes to update a data store, such as to update a value from a value listed in the section 788 to a new value listed in the section 792.

Example 11—Example Schema for Storing Master Data for IOT Analytics

As described in Examples 1 and 9, a schema in which master data is originally stored may not be optimized for use with timeseries data. For instance, the source schema may be a star schema, which may not be as suitable for use with timeseries data, such as if there is a large volume of timeseries data. FIGS. 8A and 8B illustrate how tables 808 in a source schema 804 can be mapped to a schema 812 used for master data that will be used with timeseries data, such as in the data store 668 of FIG. 6.

As shown, the tables 808 of FIG. 8A are denormalized into a single table 816 in FIG. 8B. However, in other embodiments converting a source schema to a target schema need not involve denormalization or, even if at least some source tables, table 808 are denormalized, the target schema (e.g., used in the data store 668) can include multiple tables that implement the source schema 804 (and optionally portions of one or more other schemas, such as other source schemas, for example, schemas for other applications).

Example 12—Example Operations

Figures 9A, 9B:
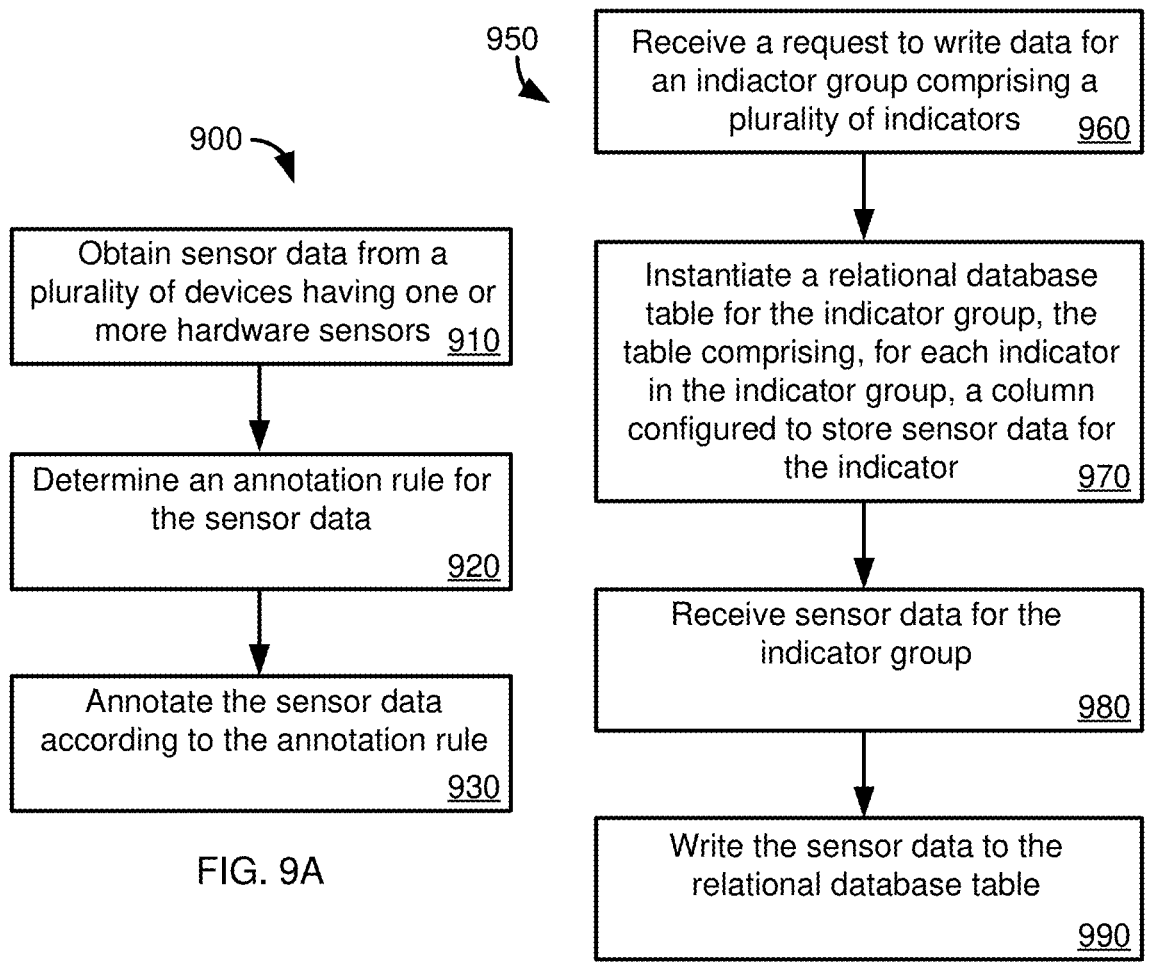
FIG. 9A is a flowchart of an example method for annotating sensor data.
FIG. 9B is a flowchart of an example method for writing sensor data to a relational database table.

FIG. 9A is a flowchart of a method 900 for annotating sensor data. The method 900 can be implemented in the computing environment 100 of FIG. 1 or the computing environment 300 of FIG. 3, using techniques described in Examples 2 and 3. In particular, at least a portion of the operations in the method 900 can be carried out by the ingestion service 100, such as by the tagger 128 optionally in conjunction with other components of the ingestion service 100.

At 910, sensor data is obtained from a plurality of devices, each device having one or more hardware sensors. An annotation rule is determined for the sensor data at 920. The sensor data is annotated according to the annotation rule at 930.

FIG. 9B is a flowchart of a method 950 for writing sensor data to a relational database table. The method 950 can be implemented in the computing environment 300, such as by the database writer 374, using techniques described in Example 3. A table to which the sensor data is written can have the schema 550 or the schema 580.

At 960, a request is received to write data for an indicator group having a plurality of indicators, where an indicator can be a hardware sensor of a device. A relational database table for the indicator group is instantiated at 970. The table includes, for each indicator in the indicator group, a column to store sensor data for that indicator. Sensor data for the indicator group is received at 980. At 990, the sensor data is written to the relational database table.

Example 13—Computing Systems

Figure 10:
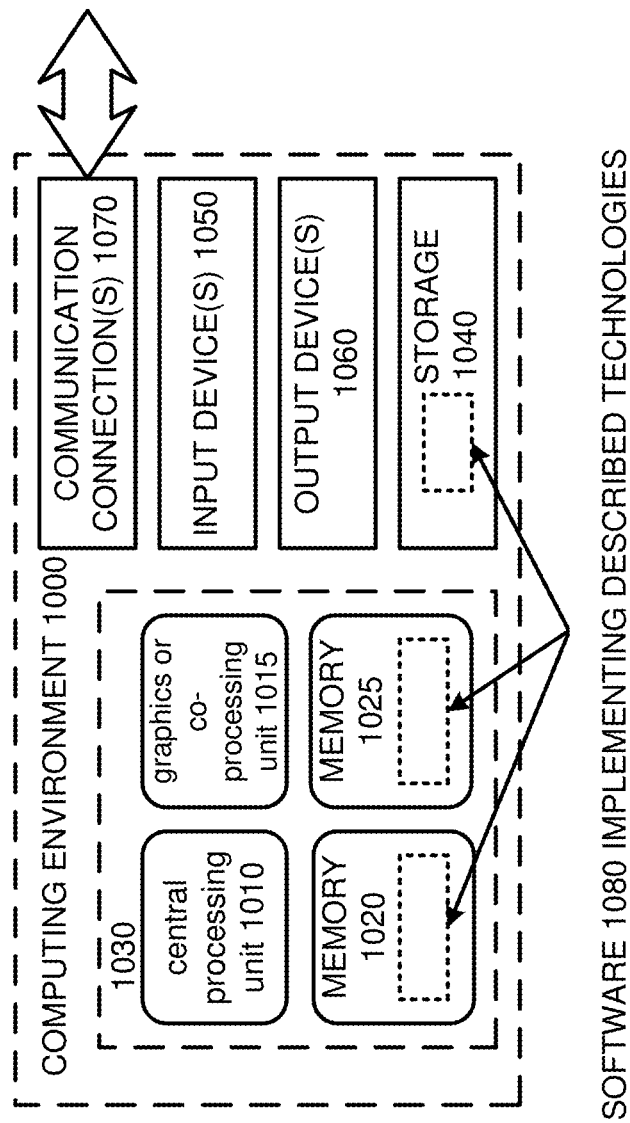
FIG. 10 is a diagram of an example computing system in which some described embodiments can be implemented.

FIG. 10 depicts a generalized example of a suitable computing system 1000 in which the described innovations may be implemented. The computing system 1000 is not intended to suggest any limitation as to scope of use or functionality of the present disclosure, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions, such as for implementing the technologies described in Examples 1-12. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s) 1010, 1015. The memory 1020, 1025 stores software 1080 implementing one or more innovations described herein, in the form of computer-executable instructions suitable for execution by the processing unit(s) 1010, 1015.

A computing system 1000 may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way, and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. The output device(s) 1060 may be a display, printer, speaker, CD-writer, or another device that provides output from the computing system 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 14—Cloud Computing Environment

Figure 11:
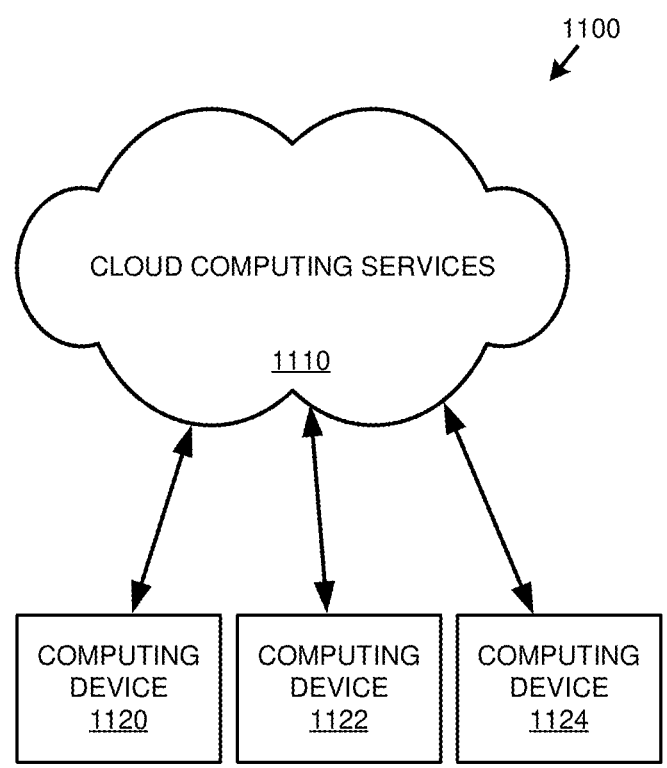
FIG. 11 is an example cloud computing environment that can be used in conjunction with the technologies described herein.

FIG. 11 depicts an example cloud computing environment 1100 in which the described technologies can be implemented. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operators (e.g., data processing, data storage, and the like).

Example 15—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 10, computer-readable storage media include memory 1020 and 1025, and storage 1040. The term computer-readable storage media does not include signals and carrier waves. In addition, the term computer-readable storage media does not include communication connections (e.g., 1070).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C#, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A system for storing aggregated sensor data into a relational database, comprising:
   memory;
   one or more processing units coupled to the memory; and
   one or more computer readable storage media storing instructions that, when loaded into the memory, cause the one or more processing units to perform operations comprising:
      by a first ingestion service, periodically reading, from a first streaming service, first sensor data from a first plurality of devices, wherein each device of the first plurality of devices comprises one or more hardware sensors;
      determining a first set of attributes or metadata elements to apply to the first sensor data and annotating the first sensor data by a first tagging component to generate first tagged data, wherein annotating the first sensor data comprises adding metadata to or editing metadata of the first sensor data, wherein the first set of attributes or metadata elements applied to the first sensor data comprises an identifier for a first client, first system, or first application that is to receive the first sensor data, wherein the one or more hardware sensors of the first plurality of devices are grouped into a first set of one or more indicator groups, and wherein the first tagged data are stored as timeseries data in a first data store;
      by a first aggregation engine, aggregating data for a first indicator group of the first set of one or more indicator groups by generating a first set of one or more aggregated values from the first tagged data stored in the first data store;
      by the first aggregation engine, writing aggregated values of the first set of one or more aggregated values back to the first data store as first aggregates in a first semi-structured format; and
      by a first database writer, instantiating a first relational database table with a first schema that is based on data types of the first set of one or more aggregated values for a first indicator group of the first set of one or more indicator groups, the first relational database table comprising, for each respective hardware sensor in the first indicator group, a respective column storing aggregate values for a respective hardware sensor of the first indicator group, wherein instantiating the first relational database table comprises defining a first set of one or more standard columns and a second set of one or more columns for each respective hardware sensor in the first indicator group used for relational database table creation;
      calling a first read data method to retrieve data for at least a portion of the aggregate values stored in the first relational database table, and writing the at least a portion of the aggregate values to the first relational database table according to the first schema;
      by a second ingestion service, periodically reading, from a second streaming service, second sensor data from a second plurality of devices, wherein each device of the second plurality of devices comprises one or more hardware sensors, wherein the second ingestion service is the first ingestion service or is different from the first ingestion service, the second streaming service is the first streaming service or is a streaming service other than the first streaming service, and at least one sensor of a device of the second plurality of devices differs from a sensor of a device of the first plurality of devices;
      determining a second set of attributes or metadata elements to apply to the second sensor data and annotating the second sensor data by a second tagging component to generate second tagged data, wherein annotating the second sensor data comprises adding metadata to or editing metadata of the second sensor data, wherein the second set of attributes or metadata elements applied to the second sensor data comprises an identifier for a second client, second system, or second application that is to receive the second sensor data, wherein the one or more hardware sensors of the second plurality of devices are grouped into a second set of one or more indicator groups, the second tagged data are stored as timeseries data in a second data store, the second data store being the same as or different that the first data store, the second set of attributes or metadata elements is the first set of attributes or metadata elements or is different than the first set of attributes or metadata elements, and respectively, the identifier of the second client, the second system, or second application are the same as, or different from, the identifier of the first client, the first system, or the first application;
      by a second aggregation engine, aggregating data for a first indicator group of the second set of one or more indicator groups by generating a second set of one or more aggregated values from the second tagged data stored in the second data store, wherein the second aggregation engine is the same as or different than the first aggregation engine;
      by the second aggregation engine, writing aggregated values of the second set of one or more aggregated values back to the second data store as second aggregates in a second semi-structured format, wherein the second semi-structured format is the same as or is different than the first semi-structured format; and by a second database writer, instantiating a second relational database table with a second schema that is based on data types of the second set of one or more aggregated values for a first indicator group of the second set of one or more indicator groups, the second relational database table comprising, for each respective hardware sensor in the first indicator group of the second set of one or more indicator groups, a respective column storing aggregate values for a respective hardware sensor of the first indicator group of the second set of one or more indicator groups, wherein instantiating the second relational database table comprises defining a third set of one or more standard columns and a fourth set of one or more columns for each respective hardware sensor in the first indicator group in the second set of one or more indicator groups used for relational database table creation, wherein the second database writer is the first database writer or is different than the first database writer;

calling a second read data method to retrieve data for at least a portion of the aggregate values stored in the second relational database table, and writing the at least a portion of the aggregates to the second relational database table according to the second schema, wherein the second read data method is the first read data method or is different than the second read data method.

2. The system of claim 1, wherein generating the one or more aggregated values comprises generating aggregate values over a time period represented by the timeseries data being processed.

3. The system of claim 2, wherein the one or more aggregated values generated by the aggregation engine includes minimum or maximum values over the time period.

4. The system of claim 2, wherein the one or more aggregated values generated by the aggregation engine includes a count value for the time period.

5. The system of claim 1, wherein, a new sensor is added to an indicator group and a new indicator and its values are added as entries to columns of the corresponding relational database table.

6. The system of claim 1, wherein the one or more standard columns of the relational database table includes a column that provides time information for a given row of the table.

7. The system of claim 1, wherein the plurality of devices include one or more Internet of Things (IOT) devices.

8. A method, implemented in an ingestion service system comprising a memory and one or more processing units, comprising:

obtaining Internet of Things (IOT) data from a plurality of IOT devices, wherein each IOT device of the plurality of IOT devices comprises one or more hardware sensors;

determining a set of attributes or metadata elements to apply to the IOT data and annotating the IOT data by a tagging component to generate tagged data, wherein annotating the IOT data includes adding metadata to or editing metadata of the IOT data including adding an identifier for a client, system, or application that is to receive the sensor data, wherein the one or more hardware sensors are grouped into one or more groups, and wherein the tagged data are stored as timeseries data in a data store in a semi-structured format;

aggregating data for a given group by generating one or more aggregated values from the tagged data stored in the data store;

writing the aggregated values back to the data store in the semi-structured format;

instantiating a relational database table with a schema that is based on data types of the aggregated values for an indicator group, the relational database table comprising, for each respective hardware sensor in a given group, a respective column configured to store aggregated values associated with the respective hardware sensor; and calling a read data method to retrieve the aggregated values and writing the aggregated values to the relational database table in accordance with the schema.

9. The method of claim 8, wherein generating the one or more aggregated values comprises generating aggregate values over a time period represented by the timeseries data being processed.

10. The method of claim 9, wherein the one or more aggregated values generated by the aggregation engine includes minimum or maximum values over the time period.

11. The method of claim 9, wherein the one or more aggregated values generated by the aggregation engine includes a count value for the time period.

12. The method of claim 8, wherein, a new sensor is added to an indicator group, and a new indicator and its values are added as entries to columns of the relational database table.

13. The method of claim 8, wherein the relational database table includes a column that provides time information for a given row of the table.

14. The method of claim 13, wherein the time information comprises start and stop timestamps, an aggregate generation time, an initial reading time, or a last reading time.

15. The method of claim 8, wherein the IOT data is sent to a streaming service, and wherein data in the streaming service is periodically read by the ingestion service system.

16. An ingestion service system comprising a memory and one or more processing units, wherein the ingestion service system is configured to carry out a method comprising:

obtaining Internet of Things (IOT) data from a plurality of IOT devices, wherein each IOT device of the plurality of IOT devices comprises one or more hardware sensors;

determining a set of attributes or metadata elements to apply to the IOT data and annotating the IOT data by a tagging component to generate tagged data, wherein annotating the IOT data includes adding metadata to or editing metadata of the IOT data including adding an identifier for a client, system, or application that is to receive the sensor data, wherein the one or more hardware sensors are grouped into one or more groups, and wherein the tagged data are stored as timeseries data in a data store in a semi-structured format;

aggregating data for a given group by generating one or more aggregated values from the tagged data stored in the data store;

writing the aggregated values back to the data store in the semi-structured format;

instantiating a relational database table with a schema that is based on data types of the aggregated values for an indicator group, the relational database table comprising, for each respective hardware sensor in a given group, a respective column configured to store aggregated values associated with the respective hardware sensor; and calling a read data method to retrieve the aggregated values and writing the aggregated values to the relational database table in accordance with the schema.

17. The ingestion service system of claim 16, wherein generating the one or more aggregated values comprises generating aggregate values over a time period represented by the timeseries data being processed.

18. The ingestion service system of claim 17, wherein the one or more aggregated values generated by the aggregation engine includes minimum or maximum values over the time period or a count value for the time period.

19. The ingestion service system of claim 16, wherein, a new sensor is added to an indicator group, and a new indicator and its values are added as entries to columns of the relational database table.

20. The ingestion service system of claim 16, wherein the relational database table includes a column that provides time information for a given row of the table, and wherein the time information comprises start and stop timestamps, an aggregate generation time, an initial reading time, or a last reading time.

* * * * *